(12) United States Patent
Matsumoto

(10) Patent No.: US 10,597,471 B2
(45) Date of Patent: Mar. 24, 2020

(54) COLORED PARTICLE DISPERSION

(71) Applicant: KAO CORPORATION, Tokyo (JP)

(72) Inventor: Yuuta Matsumoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 54 days.

(21) Appl. No.: 15/753,735

(22) PCT Filed: Aug. 23, 2016

(86) PCT No.: PCT/JP2016/074561
§ 371 (c)(1),
(2) Date: Feb. 20, 2018

(87) PCT Pub. No.: WO2017/033942
PCT Pub. Date: Mar. 2, 2017

(65) Prior Publication Data
US 2018/0258200 A1    Sep. 13, 2018

(30) Foreign Application Priority Data
Aug. 24, 2015 (JP) .................................. 2015-164856

(51) Int. Cl.
| | | |
|---|---|---|
| *C08K 3/00* | (2018.01) | |
| *C08F 20/26* | (2006.01) | |
| *C09D 11/322* | (2014.01) | |
| *C09D 17/00* | (2006.01) | |
| *C09D 11/326* | (2014.01) | |
| *B41M 5/00* | (2006.01) | |
| *C08K 3/013* | (2018.01) | |
| *C08F 2/22* | (2006.01) | |
| *C08F 6/02* | (2006.01) | |
| *C08K 5/00* | (2006.01) | |
| *C08K 5/17* | (2006.01) | |

(52) U.S. Cl.
CPC .............. *C08F 20/26* (2013.01); *B41M 5/00* (2013.01); *C08F 2/22* (2013.01); *C08F 6/02* (2013.01); *C08K 3/013* (2018.01); *C08K 5/0041* (2013.01); *C08K 5/17* (2013.01); *C09D 11/322* (2013.01); *C09D 11/326* (2013.01); *C09D 17/00* (2013.01); *C09D 17/003* (2013.01)

(58) Field of Classification Search
CPC ... C08F 20/26; C08F 2/22; C08F 6/03; C08K 3/013; C08K 5/0041; C08K 5/17; C09D 11/322; C09D 11/326; C09D 17/00; C09D 17/003; B41M 5/00
USPC ....................................................... 523/200
See application file for complete search history.

(56) References Cited

U.S. PATENT DOCUMENTS

| | | | |
|---|---|---|---|
| 9,879,148 B2* | 1/2018 | Matsumoto | .......... C09D 11/322 |
| 10,246,601 B2* | 4/2019 | Matsumoto | .......... C09D 11/322 |
| 10,266,716 B2* | 4/2019 | Matsumoto | ................ B41J 2/01 |
| 2003/0097961 A1 | 5/2003 | Yatake et al. | |
| 2003/0195274 A1 | 10/2003 | Nakamura et al. | |
| 2004/0229974 A1 | 11/2004 | Miyabayashi | |
| 2005/0124726 A1 | 6/2005 | Yatake et al. | |
| 2005/0282932 A1* | 12/2005 | Takizawa | .............. C08F 230/02 523/160 |
| 2009/0247669 A1 | 10/2009 | Jung et al. | |
| 2014/0171558 A1 | 6/2014 | Yatake et al. | |

(Continued)

FOREIGN PATENT DOCUMENTS

| | | |
|---|---|---|
| EP | 1 321 495 A1 | 6/2003 |
| JP | 2003-306611 A | 10/2003 |
| JP | 2003-327872 A | 11/2003 |
| JP | 2005-97518 A | 4/2005 |
| JP | 2012-201691 A | 10/2012 |
| JP | 2015-48466 A | 6/2015 |
| JP | 2015-113458 A | 6/2015 |
| WO | WO 01/94482 A1 | 12/2001 |
| WO | WO 03/033602 A1 | 4/2003 |
| WO | WO 2015/093275 A1 | 6/2015 |

OTHER PUBLICATIONS

International Search Report, issued in PCT/JP2016/074561, dated Nov. 22, 2016.

(Continued)

*Primary Examiner* — Hannah J Pak
(74) *Attorney, Agent, or Firm* — Birch, Stewart, Kolasch & Birch, LLP

(57) ABSTRACT

The present invention relates to [1] a colored fine particle dispersion containing colored fine particles and a neutralizing agent, in which the colored fine particles are produced by subjecting a monomer mixture containing an acid group-containing polymerizable monomer to emulsion polymerization in the presence of a pigment; the neutralizing agent contains a water-soluble amine compound; and the colored fine particle dispersion has a pH value of from 6 to 11, and [2] a process for producing a colored fine particle dispersion containing colored fine particles and a neutralizing agent, said process including the step 1 of subjecting a monomer mixture containing an acid group-containing polymerizable monomer to emulsion polymerization in the presence of a pigment to obtain a colored fine particle dispersion (p); and the step 2 of mixing the colored fine particle dispersion (p) and the neutralizing agent containing a water-soluble amine compound to obtain the colored fine particle dispersion having a pH value of from 6 to 11. The colored fine particle dispersion of the present invention is used in a water-based ink so that the resulting water-based ink is excellent in ejection stability upon evaporation of water from the ink system while maintaining excellent storage stability thereof, and it is possible to obtain printed materials that are excellent in alcohol resistance even when printed on a low-water absorbing printing medium.

14 Claims, No Drawings

(56) References Cited

U.S. PATENT DOCUMENTS

2016/0304735 A1 10/2016 Matsumoto
2019/0136077 A1* 5/2019 Matsumoto ............... C09C 3/10

OTHER PUBLICATIONS

European Patent Office Communication and extended search report issued in the corresponding European Patent Application No. 16839289.2 dated May 22, 2019.

* cited by examiner

COLORED PARTICLE DISPERSION

FIELD OF THE INVENTION

The present invention relates to a colored fine particle dispersion and a process for producing the colored fine particle dispersion.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods have become rapidly spread because of various advantages such as easiness of full coloration, low cost, capability of using a plain paper as the printing medium, non-contact with printed characters or images, etc. In recent years, in order to impart good weathering resistance and good water resistance to the printed materials, an ink containing a pigment as a colorant has been extensively used.

On the other hand, it has been required to print characters or images on a printing medium for commercial printing purposes using a low-liquid absorbing coated paper such as an offset-coated paper, or a non-liquid absorbing resin film such as a polyvinyl chloride resin film, a polypropylene resin film and a polyester resin film.

It is known that when characters or images are printed on the low-liquid absorbing or non-liquid absorbing printing media by the ink-jet printing methods, there tend to occur problems such as prolonged drying time owing to slow or no absorption of liquid components, and deterioration in rub fastness early after printing. Also, it is known that unlike a plain paper in which a pigment is easily penetrated, the low-liquid absorbing or non-liquid absorbing printing media tend to suffer from deposition of pigment particles remaining thereon which are directly susceptible to an external force, so that the characters or images printed on these printing media tend to be deteriorated in rub fastness even after being dried.

In order to improve rub fastness of the printed characters or images after being dried, there are known technologies for incorporating rein particles having a film-forming capability into the water-based ink.

For example, JP 2015-48466A (Patent Literature 1) discloses a process for producing a water-based ink for ink-jet printing which is excellent in storage stability as well as rub fastness and solvent resistance when printed on a low-water absorbing printing medium, said process including the steps of subjecting a monomer mixture containing (meth)acrylic acid and a (meth)acrylic acid ester in a total amount of not less than 90% by mass to emulsion polymerization to obtain an emulsion A containing acrylic acid-based copolymer particles having a weight-average molecular weight of not less than 100,000; adding and dispersing a pigment into the emulsion A to obtain a pigment dispersion; subjecting a monomer mixture containing (meth)acrylic acid and a (meth)acrylic acid ester in a total amount of not less than 90% by mass to emulsion polymerization to obtain an emulsion B containing acrylic acid-based copolymer particles having a weight-average molecular weight of not less than 100,000; and mixing the pigment dispersion, the emulsion B and an organic solvent with each other to obtain the water-based ink.

In addition, JP 2012-201691A (Patent Literature 2) discloses an ink composition that is excellent in storage stability, ejection properties, printability for production of printed materials, rub fastness, water resistance, solvent resistance, etc., and has good sustainability against not only rubbing between the printed materials upon continuous printing but also contact with water or an alcohol-based solvent, and further exhibits good ejection properties, in which the ink composition contains resin particles having an average particle size and a coarse particle content which fall within respective specific ranges, and a humectant solvent.

SUMMARY OF THE INVENTION

The present invention relates to a colored fine particle dispersion containing colored fine particles and a neutralizing agent, in which the colored fine particles are produced by subjecting a monomer mixture containing an acid group-containing polymerizable monomer to emulsion polymerization in the presence of a pigment, the neutralizing agent contains a water-soluble amine compound, and the colored fine particle dispersion has a pH value of not less than 6 and not more than 11.

DETAILED DESCRIPTION OF THE INVENTION

In the technology described in the aforementioned Patent literature 1, although the ink has good storage stability, there tends to occur such a problem that the ink is deteriorated in ejection properties with the increase in its viscosity in association with increased concentration of the ink upon evaporation of water from the ink system. Furthermore, there also tends to occur such a problem that the ink is insufficient in alcohol resistance when printed on a a low-water absorbing printing medium.

In addition, in the technology described in the aforementioned Patent literature 2, in order to improve ejection properties and alcohol resistance of the ink upon evaporation of water therefrom, it is required to control an average particle size of resin fine particles and the number of coarse particles therein as well as the kind and amount of solvent to be compounded in the ink.

The present invention relates to a colored fine particle dispersion capable of providing a water-based ink that is excellent in ejection stability upon evaporation of water from the ink system while maintaining excellent storage stability thereof, and obtaining printed materials that are excellent in alcohol resistance even when printed on a low-water absorbing printing medium, and a process for producing the colored fine particle dispersion.

Meanwhile, the term "printing" as used in the present specification is a concept that includes printing or typing operation for printing characters or images, and the term "printed material" as used in the present specification is a concept that includes printed matters or typed materials on which characters or images are printed. In addition, the term "low-water absorbing" printing medium as used in the present specification is a concept that includes both of a low-water absorbing printing medium and a non-water absorbing printing medium, and means a printing medium having a water absorption of not less than 0 $g/m^2$ and not more than 10 $g/m^2$ as measured under the condition that a contact time between the printing medium and pure water is 100 milliseconds.

The present inventors have found that by using a colored fine particle dispersion containing colored fine particles obtained by subjecting a monomer mixture containing an acid group-containing polymerizable monomer to emulsion polymerization in the presence of a pigment, and a neutralizing agent containing a water-soluble amine compound, and having a pH value of not less than 6 and not more than 11, for a water-based ink, it is possible to provide the water-based ink that is excellent in ejection stability upon evaporation of water from the ink system while maintaining excellent storage stability of the ink, and obtain a printed material that is excellent in alcohol resistance even when printed on a low-water absorbing printing medium.

That is, the present invention relates to the following aspects [1] and [2].

[1] A colored fine particle dispersion containing colored fine particles and a neutralizing agent, in which the colored fine particles are produced by subjecting a monomer mixture containing an acid group-containing polymerizable monomer to emulsion polymerization in the presence of a pigment; the neutralizing agent contains a water-soluble amine compound; and the colored fine particle dispersion has a pH value of not less than 6 and not more than 11.

[2] A process for producing a colored fine particle dispersion containing colored fine particles and a neutralizing agent, said process including the following steps 1 and 2:

Step 1: subjecting a monomer mixture containing an acid group-containing polymerizable monomer to emulsion polymerization in the presence of a pigment to obtain a colored fine particle dispersion (p); and Step 2: mixing the colored fine particle dispersion (p) and the neutralizing agent containing a water-soluble amine compound to obtain the colored fine particle dispersion having a pH value of not less than 6 and not more than 11.

In accordance with the present invention, there are provided a colored fine particle dispersion capable of providing a water-based ink that is excellent in ejection stability upon evaporation of water from the ink system while maintaining excellent storage stability of the ink, and obtaining a printed material that is excellent in alcohol resistance even when printed on a low-water absorbing printing medium, and a process for producing the colored fine particle dispersion.

[Colored Fine Particle Dispersion]

The colored fine particle dispersion of the present invention contains colored fine particles and a neutralizing agent, in which the colored fine particles are produced by subjecting a monomer mixture containing an acid group-containing polymerizable monomer to emulsion polymerization in the presence of a pigment; the neutralizing agent contains a water-soluble amine compound; and the colored fine particle dispersion has a pH value of not less than 6 and not more than 11.

The colored fine particle dispersion of the present invention may be used in a water-based ink, for example, may be used in a water-based ink for flexo printing, gravure printing or ink-jet printing. In particular, the colored fine particle dispersion of the present invention is excellent in ejection stability, and therefore can be preferably used in a water-based ink for ink-jet printing, i.e., a water-based ink for ink-jet recording.

Meanwhile, the "colored fine particles" as used in the present invention mean the particles obtained by coating pigment particles with a polymer, the "emulsion polymerization" as used in the present invention means a method of emulsifying or dispersing the monomer mixture containing the acid group-containing polymerizable monomer in a dispersing medium containing water as a main component in the presence of a surfactant, and polymerizing the resulting emulsion or dispersion using a polymerization initiator. In the aforementioned method, by subjecting the monomer mixture containing the acid group-containing polymerizable monomer to emulsion polymerization in the presence of the pigment, it is possible to obtain the particles formed by coating the pigment particles with the polymer.

The "coating" as used in the present invention means such a condition in which the surface of the respective pigment particles may be at least partially coated with the polymer, or may be wholly coated with the polymer.

In addition, as the configuration of the colored fine particles, there may be mentioned, for example, the particle configuration in which the pigment is enclosed within the respective polymer particles, the particle configuration in which the pigment is uniformly dispersed in the respective polymer particles, the particle configuration in which the pigment is exposed onto a surface of the respective polymer particles, and the like.

The colored fine particle dispersion of the present invention can exhibit such a remarkable effect that when used in a water-based ink, the resulting water-based ink is excellent in ejection stability upon evaporation of water from the ink system (hereinafter also referred to merely as "ejection stability") while maintaining excellent storage stability of the ink, and it is possible to obtain a printed material that is excellent in alcohol resistance when printed on a low-water absorbing printing medium (hereinafter also referred to merely as "alcohol resistance"). The reason why the above advantages effects can be attained by the present invention is considered as follows though it is not clearly determined yet.

That is, since the colored fine particles are produced by subjecting the monomer mixture containing the acid group-containing polymerizable monomer to emulsion polymerization in the presence of the pigment, the colored fine particles are obtained in the form of particles formed by coating the pigment particles with a polymer. As a result, it is considered that the acid group is present on the surface of the polymer which comes into contact with water. In addition, when the acid group is neutralized with the water-soluble amine compound, the moiety of the monomer which is neutralized therewith is rendered more hydrophobic as compared to the case where the acid group is neutralized with an alkali metal hydroxide such as sodium hydroxide. As a result, it is considered that even though the content of the dispersing medium in the dispersion is reduced by evaporation of water therefrom, it is possible to maintain dispersion stability of the colored fine particle dispersion, suppress the increase in viscosity of the dispersion in association with increased concentration thereof upon evaporation of water from the ink system, and therefore improve storage stability and ejection stability of the resulting ink.

In addition, when printed on a low-water absorbing printing medium, since the water-soluble amine compound has higher volatility than that of the alkali metal hydroxide such as sodium hydroxide, it is considered that the colored fine particle dispersion can be improved in film-forming properties owing to adequate aggregation of the colored fine particles and therefore can be improved in alcohol resistance.

<Colored Fine Particles>

The colored fine particles used in the present invention are obtained by subjecting the monomer mixture containing the acid group-containing polymerizable monomer to emulsion polymerization in the presence of the pigment. For this reason, the colored fine particles are in the form of particles formed by coating the pigment particles with a polymer, so that it is possible to introduce an acid group into the surface of the polymer which comes into contact with water as the dispersing medium.

(Pigment)

The pigment used in the present invention may be either an inorganic pigment or an organic pigment.

Examples of the inorganic pigment include carbon blacks and metal oxides. In particular, carbon blacks are preferably used for black inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigments used in the present invention is not particularly limited, and there may be used any chromatic color pigments having a yellow color, a magenta color, a cyan color, a red color, a blue color, an orange color, a green color, etc.

The pigment used in the present invention is preferably a pigment subjected to no hydrophilic treatment from the viewpoint of improving storage stability and ejection stability of the resulting water-based ink and alcohol resistance of the resulting printed material. Meanwhile, the "hydrophilic treatment" of the pigment as used herein means the treatment in which at least one anionic or cationic hydrophilic functional group is bonded onto the surface of the pigment either directly or through the other atom group. Examples of the other atom group used above include an alkanediyl group having not less than 1 and not more than 24 carbon atoms, a substituted or unsubstituted phenylene group and a substituted or unsubstituted naphthylene group. Examples of the anionic hydrophilic functional group include a carboxy group ($-COOM^1$), a sulfonic acid group ($-SO_3M^1$), wherein phosphoric acid group ($-OPO_3M^1{}_2$), and an acid group such as dissociated ion forms of these groups (such as $-COO^-$, $-SO_3^-$, $-OPO_3^{2-}$ and $-OPO_3^-M^1$), wherein $M^1$ is a hydrogen atom, an alkali metal, ammonium or organic ammonium. Examples of the cationic hydrophilic functional group include an ammonium group, an amino group, etc.

(Acid Group-Containing Polymerizable Monomer)

The monomer mixture used in the present invention contains an acid group-containing polymerizable monomer. Meanwhile, the term referred to merely as a "polymerizable monomer" or a "monomer" as used in the present invention is intended to mean the monomer excluding a polymerizable surfactant. However, in the case where the polymerizable surfactant is used in the below-mentioned emulsion polymerization, the polymerizable surfactant may be incorporated into the resulting polymer by copolymerizing the monomer mixture therewith.

The acid group-containing polymerizable monomer is a monomer containing at least an acid group and a polymerizable group in a structure thereof.

Examples of the acid group include groups capable of exhibiting an acidity by releasing hydrogen ions upon dissociation thereof, such as a carboxy group ($-COOM^2$), a sulfonic acid group ($-SO_3M^2$), a phosphoric acid group ($-OPO_3M^2{}_2$), and dissociated ion forms of these groups (such as $-COO^-$, $-SO_3^-$, $-OPO_3^{2-}$ and $-OPO_3^-M^2$) wherein $M^2$ is a hydrogen atom, an alkali metal, ammonium or organic ammonium. The polymerizable group is a group containing a radical-polymerizable unsaturated double bond in a molecule thereof. Examples of the polymerizable group include at least one group selected from the group consisting of a vinyl group, an allyl group, an acryloyl group, a methacryloyl group, a propenyl group, a vinylidene group and a vinylene group.

Examples of the acid group-containing polymerizable monomer include (meth)acrylic acid, maleic acid, itaconic acid, fumaric acid, crotonic acid, styrenesulfonic acid, 2-acrylamido-2-methylpropanesulfonic acid, 3-sulfopropyl (meth)acrylate, vinylphosphonic acid and vinyl phosphate.

Among them, from the viewpoint of improving storage stability and ejection stability of the resulting water-based ink and alcohol resistance of the resulting printed material, the acid group is preferably a carboxy group, and the carboxy group-containing polymerizable monomer is preferably at least one monomer selected from the group consisting of (meth)acrylic acid, maleic acid, itaconic acid, fumaric acid and crotonic acid, and more preferably (meth)acrylic acid. The term "(meth)acrylic acid" as used herein means at least one compound selected from the group consisting of acrylic acid and methacrylic acid, and is hereinafter defined in the same way.

The content of the acid group-containing polymerizable monomer in the monomer mixture is preferably not less than 1% by mass, more preferably not less than 3% by mass, even more preferably not less than 5% by mass and further even more preferably not less than 7% by mass from the viewpoint of improving storage stability and ejection stability of the resulting water-based ink and alcohol resistance of the resulting printed material, and is also preferably not more than 20% by mass, more preferably not more than 15% by mass and even more preferably not more than 10% by mass from the same viewpoint as described above.

The monomer mixture used in the present invention preferably further contains a hydrophobic polymerizable monomer from the viewpoint of improving dispersion stability of the colored fine particle dispersion.

The term "hydrophobic" of the hydrophobic polymerizable monomer as used in the present invention means that the amount of the monomer which can be dissolved in 100 g of ion-exchanged water as measured at 25° C. is less than 10 g.

As the hydrophobic polymerizable monomer, there may be mentioned those monomers containing at least a hydrophobic group and a polymerizable group in their structure. Examples of the hydrophobic group include at least one group selected from the group consisting of an aliphatic hydrocarbon group, an alicyclic hydrocarbon group and an aromatic hydrocarbon group. The polymerizable group is a group containing a radical-polymerizable unsaturated bond in a molecule thereof. Examples of the polymerizable group include at least one group selected from the group consisting of a vinyl group, an allyl group, an acryloyl group, a methacryloyl group, a propenyl group, a vinylidene group and a vinylene group.

The hydrophobic polymerizable monomer is preferably at least one monomer selected from the group consisting of a (meth)acrylate and an aromatic ring-containing hydrophobic monomer.

The (meth)acrylate includes those (meth)acrylates containing an alkyl group preferably having not less than 1 and not more than 10 carbon atoms and more preferably not less than 1 and not more than 8 carbon atoms. Examples of the (meth)acrylate include methyl (meth)acrylate, ethyl (meth)acrylate, (iso)propyl (meth)acrylate, (iso- or tertiary-)butyl (meth)acrylate, 2-ethylhexyl (meth)acrylate, (iso)octyl (meth)acrylate and (iso)decyl (meth)acrylate. Among these (meth)acrylates, from the viewpoint of improving dispersion stability of the colored fine particle dispersion, preferred is at least one compound selected from the group consisting of methyl (meth)acrylate, ethyl (meth)acrylate and 2-ethylhexyl (meth)acrylate, more preferred is at least one compound selected from the group consisting of methyl (meth) acrylate and 2-ethylhexyl (meth)acrylate, and even more preferred is a combination of methyl (meth)acrylate and 2-ethylhexyl (meth)acrylate.

Meanwhile, the terms "(iso- or tertiary-) " and "(iso)" as used in the present specification mean both the structure in which any of the groups expressed by "iso or tertiary" and "iso" is present, and the structure in which any of these groups is not present (i.e., normal). In addition, the term "(meth)acrylate" as used herein means at least one compound selected from the group consisting of an acrylate and a methacrylate, and is hereinafter defined in the same way.

The aromatic ring-containing hydrophobic monomer is preferably at least one monomer selected from the group consisting of a styrene-based monomer and an aromatic group-containing (meth)acrylate.

Examples of the styrene-based monomer include styrene, 2-methyl styrene, etc. Examples of the aromatic group-containing (meth)acrylate include benzyl (meth)acrylate, phenoxyethyl (meth)acrylate, etc. Of these compounds, preferred is at least one compound selected from the group consisting of styrene and benzyl (meth)acrylate, and more preferred is benzyl (meth)acrylate.

From the viewpoint of improving storage stability and ejection stability of the resulting water-based ink, the hydrophobic polymerizable monomer is preferably a combination of the (meth)acrylate and the aromatic ring-containing hydrophobic monomer.

In the case where the (meth)acrylate and the aromatic ring-containing hydrophobic monomer are used in combination with each other as the hydrophobic polymerizable monomer, the mass ratio of the (meth)acrylate to the aromatic ring-containing hydrophobic monomer [(meth)acrylate/aromatic ring-containing hydrophobic monomer] is preferably from 10/90 to 60/40, more preferably from 20/80 to 50/50, even more preferably from 25/75 to 45/55 and further even more preferably from 30/70 to 45/55.

The content of the hydrophobic polymerizable monomer in the monomer mixture is preferably not less than 80% by mass, more preferably not less than 85% by mass and even more preferably not less than 90% by mass from the viewpoint of improving dispersion stability of the colored fine particle dispersion, and is also preferably not more than 99% by mass, more preferably not more than 97% by mass, even more preferably not more than 95% by mass and further even more preferably not more than 93% by mass from the viewpoint of improving storage stability and ejection stability of the resulting water-based ink and alcohol resistance of the resulting printed material.

The monomer mixture may further contain a monomer containing a polyethylene glycol chain, if required. Examples of the monomer containing a polyethylene glycol chain include polyethylene glycol mono(meth)acrylate, methoxy polyethylene glycol mono(meth)acrylate, octoxy polyethylene glycol mono(meth)acrylate and stearoyloxy polyethylene glycol mono(meth)acrylate.

Specific examples of the commercially available products of these monomers include "NK ESTER M-90G", "NK ESTER M-230G", "NK ESTER M-450G" and "NK ESTER M-900G" all available from Shin-Nakamura Chemical Co., Ltd., and "LIGHT ESTER 041MA" available from Kyoeisha Chemical Co., Ltd.

<Neutralizing Agent>

The colored fine particle dispersion of the present invention contains a water-soluble amine compound as a neutralizing agent from the viewpoint of improving storage stability and ejection stability of the resulting water-based ink and alcohol resistance of the resulting printed material.

The term "water-soluble" as used in the present invention means that the solubility in water of the compound as measured by dissolving the compound in 100 g of water at 25° C. (hereinafter also referred to merely as "water solubility") is not less than 5 g (5 g/100 g $H_2O$). For example, the water solubility of triethylamine as measured at 20° C. is 17 g/100 g $H_2O$, the water solubility of N-dimethylaminoethanol as measured at 25° C. is 95.4 g/100 g $H_2O$, and the water solubility of N-methyldiethanoamine as measured at 25° C. is 100 g/100 g $H_2O$. The water solubility of the water-soluble amine compound as measured at 25° C. is preferably not less than 10 g/100 g $H_2O$, more preferably not less than 30 g/100 g $H_2O$, even more preferably not less than 50 g/100 g $H_2O$ and further even more preferably not less than 70 g/100 g $H_2O$ from the viewpoint of improving storage stability and ejection stability of the resulting water-based ink and alcohol resistance of the resulting printed material.

The number of carbon atoms in the water-soluble amine compound is preferably not less than 2, more preferably not less than 3 and even more preferably not less than 4 from the viewpoint of improving storage stability and ejection stability of the resulting water-based ink and alcohol resistance of the resulting printed material, and is also preferably not more than 8, more preferably not more than 6 and even more preferably not more than 5 from the same viewpoint as described above.

Specific examples of the water-soluble amine compound include trialkylamines having not less than 3 and not more than 8 carbon atoms, such as trimethylamine and triethylamine; alkanolamines containing an alkanol group having not less than 1 and not more than 4 carbon atoms, such as monoethanolamine, monopropanolamine, monobutanolamine, diethanolamine, dipropanolamine and triethanolamine; and water-miscible alkanolamines having not less than 2 and not more than 8 carbon atoms, e.g., alkylalkanolamines containing an alkyl group having not less than 1 and not more than 3 carbon atoms and an alkanol group having not less than 1 and not more than 4 carbon atoms, such as N-methylaminoethanol, N-methylaminopropanol, N-dimethylaminoethanol, N-dimethylaminopropanol, N-methyldiethanolamine and N-methyldipropanolamine. Among these water-soluble amine compounds, from the viewpoint of improving storage stability and ejection stability of the resulting water-based ink and alcohol resistance of the resulting printed material, preferred is an alkanolamine having not less than 2 and not more than 8 carbon atoms, more preferred is at least one compound selected from the group consisting of N-dimethylaminoethanol, N-methyldiethanolamine, diethanolamine and triethanolamine, even more preferred is at least one compound selected from the group consisting of N-dimethylaminoethanol and N-methyldiethanolamine, and further even more preferred is N-dimethylaminoethanol.

From the viewpoint of reducing change in viscosity of the water-based ink upon storage thereof, the water-soluble amine compound is preferably at least one compound selected from the group consisting of N-methyldiethanolamine, diethanolamine and triethanolamine, and more preferably N-methyldiethanolamine.

From the viewpoint of improving ejection stability of the resulting water-based ink and alcohol resistance of the resulting printed material, the water-soluble amine compound is preferably the alkylalkanolamine, and more preferably at least one compound selected from the group consisting of N-dimethylaminoethanol and N-methyldiethanolamine.

These neutralizing agents may be used alone or in the form of a mixture of any two or more thereof.

The content of the water-soluble amine compound in the neutralizing agent is preferably not less than 80% by mass, more preferably not less than 90% by mass, even more preferably not less than 95% by mass, further even more preferably substantially 100% by mass and still further even more preferably 100% by mass from the viewpoint of improving storage stability and ejection stability of the resulting water-based ink and alcohol resistance of the resulting printed material.

[Process for Producing Colored Fine Particle Dispersion]

The colored fine particle dispersion of the present invention is produced in the form of a dispersion of colored fine particles by the process including the following steps 1 and 2, from the viewpoint of improving storage stability and ejection stability of the resulting water-based ink and alcohol resistance of the resulting printed material:

Step 1: subjecting the monomer mixture containing the acid group-containing polymerizable monomer to emulsion polymerization in the presence of the pigment to obtain a colored fine particle dispersion (p); and Step 2: mixing the colored fine particle dispersion (p) and a neutralizing agent containing the water-soluble amine compound to obtain the colored fine particle dispersion having a pH value of not less than 6 and not more than 11.

(Step 1: Step of Producing Colored Fine Particle Dispersion (p))

The emulsion polymerization used in the production process of the present invention is not particularly limited as long as it is the method in which the monomer mixture containing the acid group-containing polymerizable monomer can be subjected to emulsion polymerization in the presence of the pigment. However, from the viewpoint of fully atomizing the pigment and coating the surface of the pigment particles (hereinafter also referred to merely as the "surface of the pigment") with the polymer to improve storage stability and ejection stability of the resulting water-based ink and alcohol resistance of the resulting printed material, the step 1 preferably includes the following steps 1a and 1b:

Step 1a: dispersing a mixed solution containing the pigment, a surfactant (a) and water to obtain a pigment dispersion (a): and Step 1b: mixing the pigment dispersion (a) and the monomer mixture containing the acid group-containing polymerizable monomer and subjecting the resulting mixture to emulsion polymerization to obtain the colored fine particle dispersion (p).

[Step 1a: Pigment Dispersing Step]

The step 1a is the step of dispersing a mixed solution containing the pigment, a surfactant (a) and water to obtain a pigment dispersion (a). By conducting the step 1a, it is possible to fully atomize the pigment and coat the surface of the pigment with the polymer and thereby uniformly disperse the pigment particles in the dispersion.

The surfactant (a) used in the step 1a is an anionic or nonionic surfactant, and any suitable emulsifier for emulsion polymerization may be used as the surfactant (a).

Examples of the anionic surfactant include at least one compound selected from the group consisting of fatty acid salts, alkylbenzenesulfonic acid salts, polyoxyethylene alkylphenylethersulfuric acid ester salts, polyoxyethylene aralkylarylethersulfuric acid ester salts, polyoxyethylene alkylethersulfuric acid ester salts and the like. Of these anionic surfactants, preferred is at least one compound selected from the group consisting of fatty acid salts, alkylbenzenesulfonic acid salts, polyoxyethylene alkylphenylethersulfuric acid ester salts, polyoxyethylene aralkylarylethersulfuric acid ester salts and polyoxyethylene alkylethersulfuric acid ester salts, and more preferred are polyoxyethylene alkylethersulfuric acid ester salts.

Examples of the nonionic surfactant include at least one compound selected from the group consisting of polyoxyethylene alkyl phenyl ethers, polyoxyethylene aralkyl aryl ethers and polyoxyethylene alkyl ethers.

The surfactant (a) is preferably at least partially constituted of a polymerizable surfactant. More specifically, it is preferred that the surfactant (a) contains a polymerizable surfactant.

The polymerizable surfactant as used in the present invention means those surfactants referred to as a reactive surfactant that can be copolymerized with a polymerizable monomer having an unsaturated double bond, and is an anionic or nonionic polymerizable surfactant (emulsifier) having at least one radical-polymerizable unsaturated double bond in a molecule thereof. Examples of the polymerizable surfactant include sulfosuccinic acid ester-based surfactants, alkylphenolether-based polymerizable group-containing surfactants and polyoxyethylene-based polymerizable group-containing surfactants. Of these polymerizable surfactants, preferred is at least one surfactant selected from the group consisting of sulfosuccinic acid ester-based surfactants, alkylphenolether-based polymerizable group-containing surfactants and polyoxyethylene-based polymerizable group-containing surfactants.

In the step 1a, as the surfactant (a), the aforementioned polymerizable surfactant can be used in combination with the other surfactant. The proportion of the aforementioned polymerizable surfactant on the basis of a whole amount of the surfactant (a) (a total amount of the polymerizable surfactant and the other surfactant) is preferably not less than 5% by mass, more preferably not less than 20% by mass and even more preferably not less than 40% by mass, and is also not more than 100% by mass.

Specific examples of the commercially available products of the polymerizable surfactant include "ADEKA REASOAP" available from ADEKA Corporation, "AQUALON" available from DSK Co., Ltd., "ELEMINOL JS" and "ELEMINOL RS" both available from Sanyo Chemical Industries Ltd., and "LATEMUL PD" available from Kao Corporation.

The amount of the surfactant (a) used in the step 1a is preferably not less than 1 part by mass, more preferably not less than 5 parts by mass and even more preferably not less than 8 parts by mass, and is also preferably not more than 50 parts by mass, more preferably not more than 30 parts by mass, even more preferably not more than 20 parts by mass and further even more preferably not more than 15 parts by mass, on the basis of 100 parts by mass of the pigment. When the amount of the polymerizable surfactant used in the step 1a is not less than 1 part by mass, the pigment can exhibit excellent dispersibility, and it is therefore possible to obtain the uniform pigment dispersion (a) containing pigment particles having a small particle size. When the amount of the polymerizable surfactant used in the step 1a is not more than 50 parts by mass, it is possible to prevent formation of particles constituted of only the polymer that is incapable of adsorbing the pigment, and suppress increase in viscosity of the resulting ink in association with increased concentration of the ink upon evaporation of water from the ink system, which tends to cause ejection defects, etc.

The dispersing medium used in the step 1a is water, and from the viewpoint of rendering the pigment easily wettable with the dispersing medium to fully atomize the pigment, it is preferred that the aforementioned mixed solution preferably further contains an organic solvent (a).

Examples of the organic solvent (a) include at least one compound selected from the group consisting of alcohols having not less than 1 and not more than 6 carbon atoms, ketones, ethers, amides, aromatic hydrocarbons and aliphatic hydrocarbons having not less than 5 and not more than 10 carbon atoms. Of these organic solvents, preferred are oxygen atom-containing polar solvents having not less than 1 and not more than 5 carbon atoms, more preferred is at least one compound selected from the group consisting of alcohols having not less than 1 and not more than 5 carbon atoms and ketones having not less than 1 and not more than 5 carbon atoms, and even more preferred are ketones having not less than 1 and not more than 5 carbon atoms. Specific examples of the organic solvent include at least one compound selected from the group consisting of methanol, ethanol, acetone and methyl ethyl ketone. Of these organic solvents, from the viewpoint of rendering the pigment easily wettable with the dispersing medium to fully atomize the pigment, methyl ethyl ketone is preferably used.

The amount of water used in the step 1a is preferably not less than 100 parts by mass, more preferably not less than 150 parts by mass and even more preferably not less than 200 parts by mass on the basis of 100 parts by mass of the pigment from the viewpoint of uniformly dispersing the pigment in water, and is also preferably not more than 500 parts by mass, more preferably not more than 400 parts by mass and even more preferably not more than 300 parts by mass on the basis of 100 parts by mass of the pigment from the same viewpoint as described above.

The ratios between amounts of water and the organic solvent (a) used in the mixed solution is not particularly limited. The mass ratio of the organic solvent (a) to water (organic solvent (a)/water) in the mixed solution is preferably not less than 0.05, more preferably not less than 0.08, even more preferably not less than 0.10 and further even more preferably not less than 0.12 from the viewpoint of improving storage stability and ejection stability of the resulting water-based ink and alcohol resistance of the resulting printed material, and is also preferably not more than 0.40, more preferably not more than 0.35, even more preferably not more than 0.30 and further even more preferably not more than 0.25 from the same viewpoint as described above.

As a mixing disperser used in the dispersion treatment for obtaining the pigment dispersion (a), there may be used various conventionally known dispersers. Examples of the dispersers include high-speed stirring mixers such as dispers and homomixers, kneading machines such as roll mills, kneaders and extruders, high-pressure dispersers such as high-pressure homogenizers, media-type dispersers such as paint shakers and beads mills, and mixing and stirring devices such as anchor blades. These dispersers may also be used in combination of any two or more thereof.

Of these dispersers, from the viewpoint of uniformly dispersing the pigment in water, high-speed stirring mixers such as dispers and homomixers and media-type dispersers such as paint shakers and beads mills are preferably used. Examples of the commercially available high-speed stirring mixers include "Ultra Disper" available from Asada Iron Works Co., Ltd., and "ROBOMICS" available from PRIMIX Corporation. Examples of the commercially available media-type dispersers include "Ultra Apex Mill" available from Kotobuki Industries Co., Ltd., and "Pico Mill" available from Asada Iron Works Co., Ltd.

When using the media-type dispersers, the material of dispersing media used in the dispersion treatment is preferably a ceramic material such as zirconia and titania, a polymer material such as polyethylene and nylon, a metal, etc. Of these materials, from the viewpoint of good abrasion resistance of the dispersing media, zirconia is more preferred. In addition, from the viewpoint of sufficiently atomizing the pigment, the diameter of the dispersing media is preferably not less than 0.003 mm and more preferably not less than 0.01 mm, and is also preferably not more than 0.5 mm and more preferably not more than 0.4 mm.

The dispersing time is preferably not less than 0.3 hour and more preferably not less than 1 hour from the viewpoint of sufficiently atomizing the pigment, and is also preferably not more than 200 hours and more preferably not more than 50 hours from the viewpoint of enhancing production efficiency of the pigment dispersion.

From the viewpoint of atomizing and dispersing the pigment, the dispersion treatment in the step 1a preferably includes a high-pressure dispersion treatment. More specifically, it is preferred that after subjecting the mixed solution containing the pigment, the polymerizable surfactant, water and the organic solvent (a) to dispersion treatment, the resulting dispersion is further subjected to high-pressure dispersion treatment to obtain the pigment dispersion (a), and it is more preferred that after subjecting the mixed solution to dispersion treatment using a high-speed stirring mixer or a media-type disperser, the resulting dispersion is further subjected to high-pressure dispersion treatment to obtain the pigment dispersion (a).

The term "high-pressure dispersion" as used herein means that the dispersion treatment is conducted under a pressure of not less than 20 MPa. The dispersing pressure is preferably not less than 50 MPa, more preferably not less than 100 MPa and even more preferably not less than 130 MPa from the viewpoint of well wetting the surface of the pigment with the surfactant to uniformly disperse the pigment in the resulting dispersion. Also, from the viewpoint of attaining good operability of the disperser used in the dispersion treatment, the dispersing pressure is preferably not more than 250 MPa and more preferably not more than 200 MPa The number of passes through the disperser upon subjecting the dispersion to the high-pressure dispersion treatment is preferably not less than 2, more preferably not less than 3, even more preferably not less than 5, further even more preferably not less than 7 and still further even more preferably not less than 9 from the viewpoint of well wetting the surface of the pigment with the surfactant to uniformly disperse the pigment in the resulting dispersion. Also, from the viewpoint of attaining good dispersion treatment efficiency, the number of passes through the disperser upon subjecting the dispersion to the high-pressure dispersion treatment is not more than 20. The operation method of the disperser upon the high-pressure dispersion treatment may be either a circulating method or a continuous method. Among these operation methods, from the viewpoint of suppressing occurrence of distribution of the dispersion condition owing to the number of passes through the disperser, preferred is a continuous method.

As the high-pressure dispersers used in the present invention, there may be mentioned homo-valve-type high-pressure homogenizers such as typically "High-Pressure Homogenizer" (tradename) available from Izumi Food Machinery Co., Ltd., and chamber-type high-pressure homogenizers such as "MICROFLUIDIZER" (tradename) available from Microfluidics Corporation, "Nanomizer" (tradename) available from Yoshida Kikai Kogyo Co., Ltd., and "Ultimizer" and "Starburst" (tradenames) both available from Sugino Machine Ltd. Of these dispersers, preferred are chamber-type high-pressure homogenizers such as "MICROFLUIDIZER" (tradename), "Nanomizer" (tradename), and "Ultimizer" and "Starburst" (tradenames).

The temperature of the dispersion upon the high-pressure dispersion treatment is not particularly limited, and is preferably not lower than 5° C. and not higher than 80° C.

[Organic Solvent Removal Step]

The step 1a preferably further includes the step of removing the organic solvent (a) from the dispersion obtained after the aforementioned dispersion treatment to obtain the pigment dispersion (a). When removing the organic solvent (a) after the dispersion treatment, the resin produced by the emulsion polymerization in the step 1b can be prevented from being coalesced together, so that it becomes possible to obtain a colored fine particle dispersion in which the colored fine particles having a small particle size are dispersed.

Examples of an apparatus used for removing the organic solvent (a) include at least one apparatus selected from the group consisting of a batch simple distillation device, a reduced pressure distillation device, a thin film distillation apparatus such as a flush evaporator, a rotary distillation device and a stirring evaporator. Among these apparatuses, from the viewpoint of efficiently removing the organic solvent from the dispersion, preferred is at least one apparatus selected from the group consisting of a rotary distillation device and a stirring evaporator. In the case where the organic solvent is removed at one time from the dispersion treatment product that is obtained in an amount as small as not more than 5 kg, the rotary distillation device is preferably used, whereas in the case where the organic solvent is removed at one time from the dispersion treatment product that is obtained in an amount as large as more than 5 kg, the stirring evaporator is preferably used. Among the rotary distillation devices, more preferred is a rotary reduced-pressure distillation device such as a rotary evaporator, and among the stirring evaporators, more preferred is a stirring tank thin film evaporator.

The temperature of the dispersion treatment product upon removing the organic solvent (a) therefrom may be appropriately selected according to the kind of organic solvent to be removed. The temperature of the dispersion treatment product upon removing the organic solvent therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The pressure used upon removal of the organic solvent (a) is preferably not less than 0.01 MPa, more preferably not less than 0.02 MPa and even more preferably not less than 0.05 MPa from the viewpoint of efficiently removing the organic solvent from the dispersion treatment product, and is also preferably not more than 0.5 MPa, more preferably not more than 0.2 MPa and even more preferably not more than 0.1 MPa from the same viewpoint as described above.

The time required for removal of the organic solvent (a) is preferably not less than 1 hour, more preferably not less than 2 hours and even more preferably not less than 5 hours, and is also preferably not more than 24 hours, more preferably not more than 12 hours and even more preferably not more than 10 hours.

The removal of the organic solvent (a) is preferably conducted until the solid content of the pigment dispersion (a) reaches preferably not less than 18% by mass, more preferably not less than 20% by mass and even more preferably not less than 25% by mass, and also preferably not more than 60% by mass, more preferably not more than 40% by mass and even more preferably not more than 35% by mass.

(Pigment Dispersion (a))

The content of the pigment in the pigment dispersion (a) is preferably not less than 5% by mass, more preferably not less than 10% by mass and even more preferably not less than 15% by mass from the viewpoint of attaining good coloring properties of the resulting ink, and is also preferably not more than 40% by mass, more preferably not more than 35% by mass and even more preferably not more than 30% by mass from the viewpoint of maintaining good dispersion stability of the pigment in the dispersion.

The content of the surfactant (a) in the pigment dispersion (a) is preferably not less than 0.1% by mass, more preferably not less than 0.5% by mass and even more preferably not less than 1.0% by mass from the viewpoint of maintaining good dispersion stability of the pigment in the dispersion, and is also preferably not more than 30% by mass, more preferably not more than 20% by mass, even more preferably not more than 10% by mass and further even more preferably not more than 5.0% by mass form the viewpoint of uniformly coating the particles of the pigment with the polymer in the emulsion polymerization step.

The solid content of the pigment dispersion (a) is preferably not less than 18% by mass, more preferably not less than 20% by mass and even more preferably not less than 25% by mass, and is also preferably not more than 60% by mass, more preferably not more than 40% by mass and even more preferably not more than 35% by mass.

[Step 1b: Emulsion Polymerization Step]

The step 1b is the step of mixing the pigment dispersion (a) obtained in the step 1a and the monomer mixture containing the acid group-containing polymerizable monomer and subjecting the resulting mixture to emulsion polymerization to obtain the colored fine particle dispersion (p).

In the pigment dispersion (a) obtained in the step 1a, the particles of the pigment are dispersed in a dispersing medium containing water as a main component, and further the surfactant is allowed to coexist therewith. When mixing such a pigment dispersion (a) with the monomer mixture containing the acid group-containing polymerizable monomer to polymerize the polymerizable group contained in the monomer mixture, for example, by adding a polymerization initiator thereto, it is possible to produce the colored fine particle dispersion (p) containing the colored fine particles formed by coating the pigment particles with the polymer.

In the step 1b, from the viewpoint of improving dispersion stability of the colored fine particle dispersion, it is preferred that a surfactant (b) is further added in addition to the surfactant (a) used in the step 1a. Examples of the surfactant (b) added in the step 1b include a polymerizable surfactant and the other surfactant. As the other surfactant, there may be used a surfactant for emulsion polymerization. From the viewpoint of stably emulsifying the monomer mixture, the surfactant (b) is preferably in the form of an anionic or nonionic surfactant similarly to the aforementioned surfactant (a). The surfactant (a) used in the step 1a and the surfactant (b) used in the step 1b may be the same or different from each other.

The surfactant (b) acts for emulsifying the monomer mixture and stably supplying the monomer mixture to the pigment dispersion (a). The surfactant (b) used for emulsifying the monomer mixture upon the emulsion polymerization may be a polymerizable surfactant that may be the same polymerizable surfactant as used in the step 1a. Since the polymerizable surfactant contains at least one radical-polymerizable unsaturated double bond in a molecule thereof, the polymerizable surfactant is copolymerized with the monomer mixture and thereby incorporated into the resulting polymer, so that it is possible to produce the colored fine particle dispersion (p) having excellent dispersion stability.

In the step 1b, it is possible to use the aforementioned polymerizable surfactant in combination with the other surfactant as the surfactant (b). The proportion of the other surfactant on the basis of a whole amount of the surfactant (b) (a total amount of the polymerizable surfactant and the other surfactant) is preferably not less than 5% by mass, more preferably not less than 20% by mass and even more preferably not less than 40% by mass, and is also not more than 100% by mass.

The amount of the surfactant (b) used in the step 1b is preferably not less than 0.5 part by mass, more preferably not less than 1 part by mass and even more preferably not less than 2 parts by mass on the basis of 100 parts by mass of the monomer mixture used in the emulsion polymerization of the step 1b from the viewpoint of improving storage stability and ejection stability of the resulting water-based ink and alcohol resistance of the resulting printed material, and is also preferably not more than 20 parts by mass, more preferably not more than 10 parts by mass and even more preferably not more than 5 parts by mass on the basis of 100 parts by mass of the monomer mixture used in the emulsion polymerization of the step 1b from the same viewpoint as described above.

(Polymerization Initiator)

In the emulsion polymerization conducted in the present invention, a polymerization initiator is preferably added to the reaction system, and from the viewpoint of fully atomizing the pigment and coating the surface of the pigment with the polymer, it is preferred that the polymerization initiator is added in the step 1b.

As the polymerization initiator, there may be used any of polymerization initiators that may be suitably used for ordinary emulsion polymerization processes. Specific examples of the polymerization initiator include persulfates such as potassium persulfate and ammonium persulfate; hydrogen peroxide; organic peroxides such as t-butyl hydroperoxide, benzoyl peroxide and cumene hydroperoxide; and azo-based polymerization initiators such as azobisdiisobutyronitrile and 2,2-azobis(2-amidinopropane) dihydrochloride. Of these polymerization initiators, from the viewpoint of reducing inclusion of coarse particles in the resulting colored fine particle dispersion, preferred is a water-soluble polymerization initiator, more preferred is an azo-based polymerization initiator, and even more preferred is an anionic azo-based polymerization initiator.

Examples of the anionic azo-based compound used as the aforementioned polymerization initiator include at least one carboxy group-containing azo compound selected from the group consisting of azobiscarboxylic acids having 8 to 16 carbon atoms, such as 1,1'-azobis(cyclohexane-1-carboxylic acid), azobiscyanocarboxylic acids having 8 to 16 carbon atoms, such as 4,4'-azobis(4-cyanovaleric acid), 2,2'-azobis (4-cyanovaleric acid) and 4,4'-azobis(2-cyanopentanoic acid), and salts of these acids. Of these anionic azo-based compounds, preferred is at least one compound selected from the group consisting of azobiscyanocarboxylic acids having 10 to 14 carbon atoms and salts of these acids, and more preferred is at least one compound selected from the group consisting of 4,4'-azobis(4-cyanovaleric acid) and salts thereof.

In addition, as the polymerization initiator, there may also be used redox-based polymerization initiators using the peroxide in combination with a reducing agent such as sodium sulfite, rongalite and ascorbic acid.

The amount of the polymerization initiator used in the present invention is preferably not less than 0.01 part by mass, more preferably not less than 0.05 part by mass and even more preferably not less than 0.1 part by mass on the basis of 100 parts by mass of the monomer mixture from the viewpoint of improving a molecular weight distribution of the resulting polymer, and is also preferably not more than 5 parts by mass, more preferably not more than 3 parts by mass and even more preferably not more than 1 part by mass on the basis of 100 parts by mass of the monomer mixture from the viewpoint of improving polymerization stability.

In the emulsion polymerization, a chain transfer agent may also be used. Examples of the chain transfer agent include mercaptans such as n-dodecyl mercaptan, t-dodecyl mercaptan and n-octyl mercaptan; xanthogens such as dimethyl xanthogen disulfide and diisobutyl xanthogen disulfide; and dipentene, indene, 1,4-cyclohexadiene, dihydrofuran and xanthene.

The dispersing medium used in the emulsion polymerization may contain, in addition to water, an optional organic solvent (b).

Examples of the organic solvent (b) include alcohols having not less than 1 and not more than 6 carbon atoms, ketones, ethers, amides, aromatic hydrocarbons and aliphatic hydrocarbons having not less than 5 and not more than 10 carbon atoms.

The ratio between amounts of water and the organic solvent (b) used in the dispersing medium is not particularly limited. The proportion of water to a whole amount of the dispersing medium is preferably not less than 50% by mass, more preferably not less than 65% by mass, even more preferably not less than 75% by mass and further even more preferably not less than 80% by mass.

The conditions of the emulsion polymerization conducted in the present invention are not particularly limited. The amount of the monomer mixture used in the emulsion polymerization is preferably not less than 1.0% by mass, more preferably not less than 5.0% by mass and even more preferably not less than 8.0% by mass on the basis of a whole reaction system used in the emulsion polymerization reaction from the viewpoint of improving ejection stability of the resulting water-based ink and alcohol resistance of the resulting printed material, and is also preferably not more than 60% by mass, more preferably not more than 40% by mass and even more preferably not more than 20% by mass on the basis of a whole reaction system used in the emulsion polymerization reaction from the viewpoint of suppressing increase in viscosity of the colored fine particle dispersion in association with increased concentration thereof upon evaporation of water therefrom.

The mass ratio of the monomer mixture to the pigment (monomer mixture/pigment) upon the emulsion polymerization is preferably from 90/10 to 10/90, more preferably from 80/20 to 20/80 and even more preferably from 75/25 to 25/75 from the viewpoint of suppressing increase in viscosity of the colored fine particle dispersion in association with increased concentration thereof upon evaporation of water therefrom as well as from the viewpoint of improving storage stability and ejection stability of the resulting water-based ink and alcohol resistance of the resulting printed material.

The pigment dispersion (a) and the monomer mixture may be mixed with each other in the step 1b by conventionally known mixing methods such as a monomer dropwise addition method, a monomer batch charging method and a pre-emulsion method, etc. Of these mixing methods, from the viewpoint of attaining good polymerization stability, the pre-emulsion method is preferably used. The pre-emulsion method is such a method in which a pre-emulsion prepared by previously mixing and emulsifying the monomer mixture, the surfactant and water is added dropwise to the pigment dispersion.

That is, from the viewpoint of attaining good polymerization stability, the step 1b is preferably the step of adding the pre-emulsion that contains the monomer mixture containing the acid group-containing polymerizable monomer, the surfactant (b) and water to the pigment dispersion (a) and subjecting the resulting mixture to emulsion polymerization. More specifically, as the method of mixing the pigment dispersion (a) and the monomer mixture in the step 1b, there may be mentioned the method including the step of conducting the emulsion polymerization while adding dropwise the pre-emulsion that contains the monomer mixture, the surfactant (b) and water into the pigment dispersion (a).

From the viewpoint of suppressing formation of coarse particles, the pre-emulsion may be prepared using a rotary stirring device. In this case, the rotating speed of the rotary stirring device is preferably controlled to not less than 200 rpm and more preferably not less than 300 rpm. From the same viewpoint as described above, the rotating speed of the rotary stirring device is also preferably controlled to not more than 5000 rpm, more preferably not more than 2000 rpm and even more preferably not more than 1000 rpm. The stirring time is preferably not less than 10 minutes, and is also preferably not more than 60 minutes.

In the pre-emulsion method, the time of the dropwise addition of the pre-emulsion is preferably not less than 0.5 hour and more preferably not less than 1 hour from the viewpoint of obtaining emulsified particles having a uniform particle size in the resulting emulsion, and is also preferably not more than 8 hours and more preferably not more than 6 hours from the viewpoint of improving reactivity of the emulsion polymerization. The aging time is preferably not less than 0.5 hour and more preferably not less than 1 hour, and is also preferably not more than 5 hours and more preferably not more than 3 hours.

The polymerization temperature used upon the emulsion polymerization may be appropriately controlled according to a decomposition temperature of the polymerization initiator, and is preferably not lower than 50° C., more preferably not lower than 60° C. and even more preferably not lower than 70° C. from the viewpoint of improving reactivity of the emulsion polymerization, and is also preferably not higher than 90° C. and more preferably not higher than 85° C. from the viewpoint of improving the molecular weight distribution of the resulting polymer.

The polymerization temperature when using a persulfate as the water-soluble polymerization initiator is preferably not lower than 70° C. and more preferably not lower than 75° C. from the viewpoint of improving reactivity of the emulsion polymerization, and is also preferably not higher than 85° C. and more preferably not higher than 83° C. from the viewpoint of improving the molecular weight distribution of the resulting polymer.

The polymerization atmosphere is preferably a nitrogen atmosphere or an atmosphere of an inert gas such as argon from the viewpoint of improving reactivity of the emulsion polymerization.

The colored fine particle dispersion (p) obtained according to the production process of the present invention is in the form of a dispersion prepared by dispersing the colored fine particles obtained by subjecting the monomer mixture containing the acid group-containing polymerizable monomer to emulsion polymerization in the presence of the pigment, in a dispersing medium containing water as a main medium.

In this case, the colored fine particles in the colored fine particle dispersion (p) is preferably in the form of composite particles obtained by coating at least a part of the surface of the respective pigment particles with the polymer. Examples of the configuration of the colored fine particles in the colored fine particle dispersion (p) include the particle configuration in which the pigment is enclosed within the respective polymer particles, the particle configuration in which the pigment is uniformly dispersed in the respective polymer particles, the particle configuration in which the pigment is exposed onto the surface of the respective polymer particles, and the like.

(Contents of Respective Components in Colored Fine Particle Dispersion (p))

The content (solid content) of the colored fine particles in the colored fine particle dispersion (p) is preferably not less than 10% by mass, more preferably not less than 15% by mass, even more preferably not less than 20% by mass and further even more preferably not less than 25% by mass form the viewpoint of stably emulsifying and dispersing the colored fine particles, and is also preferably not more than 60% by mass, more preferably not more than 55% by mass, even more preferably not more than 50% by mass and further even more preferably not more than 40% by mass form the same viewpoint as described above.

The content of the pigment in the colored fine particle dispersion (p) is preferably not less than 1.0% by mass, more preferably not less than 3.0% by mass, even more preferably not less than 5.0% by mass and further even more preferably not less than 10% by mass form the viewpoint of improving optical density of the printed characters or images, and is also preferably not more than 45% by mass, more preferably not more than 40% by mass, even more preferably not more than 30% by mass and further even more preferably not more than 25% by mass form the viewpoint of stably emulsifying and dispersing the colored fine particles.

The content of the polymer in the colored fine particle dispersion (p) is preferably not less than 1.0% by mass, more preferably not less than 5.0% by mass and even more preferably not less than 10% by mass form the viewpoint of improving storage stability and ejection stability of the resulting water-based ink and alcohol resistance of the resulting printed material, and is also preferably not more than 50% by mass, more preferably not more than 40% by mass, even more preferably not more than 30% by mass and further even more preferably not more than 25% by mass form the same viewpoint as described above.

The mass ratio of the pigment to the polymer [pigment/polymer] in the colored fine particle dispersion (p) obtained in the step 1b is preferably not less than 0.1, more preferably not less than 0.2 and even more preferably not less than 0.4 form the viewpoint of enhancing optical density of the printed characters or images as well as form the viewpoint of suppressing increase in viscosity of the colored fine particle dispersion in association with increased concentration of the colored fine particle dispersion upon evaporation of water therefrom and improving storage stability and ejection stability of the resulting water-based ink and alcohol resistance of the resulting printed material, and is also preferably not more than 4.0, more preferably not more than 3.0 and even more preferably not more than 2.0 form the same viewpoint as described above.

(Step 2: Neutralization Step)

Form the viewpoint of improving dispersion stability of the colored fine particle dispersion as well as form the viewpoint of improving storage stability and ejection stability of the resulting water-based ink and alcohol resistance of the resulting printed material, the production process of the present invention includes the step 2 of mixing the colored fine particle dispersion (p) and a neutralizing agent containing a water-soluble amine compound to obtain the colored fine particle dispersion having a pH value of not less than 6 and not more than 11 according to the present invention. When neutralizing the acid group contained in the colored fine particle dispersion (p) obtained in the step 1 with the water-soluble amine compound, it is considered that the acid group moiety neutralized with the water-soluble amine compound is rendered more hydrophobic as compared to the case where an alkali metal hydroxide such as sodium hydroxide is used as the neutralizing agent, so that even when the amount of the dispersing medium in the colored fine particle dispersion is reduced by evaporation of water therefrom, it is possible to maintain good dispersion stability of the colored fine particle dispersion, suppress increase in viscosity of the colored fine particle dispersion in association with increased concentration thereof, and stabilize storage stability and ejection stability of the resulting water-based ink.

In addition, when printing characters or images on a low-water absorbing printing medium, it is considered that by using the water-soluble amine compound as the neutralizing agent, the colored fine particle dispersion can be improved in film-forming properties by adequate aggregation of the colored fine particles owing to volatility of the water-soluble amine compound, and therefore can be improved in alcohol resistance.

The step 2 is preferably carried out such that the pH value of the obtained colored fine particle dispersion is not less than 6, preferably not less than 7, more preferably not less than 7.5 and even more preferably not less than 8 form the viewpoint of improving storage stability and ejection stability of the resulting water-based ink and alcohol resistance of the resulting printed material, and is also not more than 11, preferably not more than 10, more preferably not more than 9.5 and even more preferably not more than 9 from the same viewpoint as described above.

In the colored fine particle dispersion obtained according to the production process of the present invention, the colored fine particles are produced by subjecting the monomer mixture containing the acid group-containing polymerizable monomer to emulsion polymerization in the presence of the pigment; the neutralizing agent contains the water-soluble amine compound; the pH value of the colored fine particle dispersion is controlled to not less than 6 and not more than 11; and further the colored fine particles are dispersed in a dispersing medium containing water as a main medium.

(Contents of Respective Components in Colored Fine Particle Dispersion)

The content (solid content) of the colored fine particles in the colored fine particle dispersion is preferably not less than 5% by mass, more preferably not less than 10% by mass and even more preferably not less than 15% by mass form the viewpoint of stably emulsifying and dispersing the colored fine particles, and is also preferably not more than 60% by mass, more preferably not more than 50% by mass, even more preferably not more than 40% by mass and further even more preferably not more than 30% by mass form the same viewpoint as described above.

The content of the pigment in the colored fine particle dispersion is preferably not less than 1.0% by mass, more preferably not less than 3.0% by mass, even more preferably not less than 5.0% by mass and further even more preferably not less than 7.0% by mass form the viewpoint of improving optical density of the printed characters or images, and is also preferably not more than 40% by mass, more preferably not more than 30% by mass, even more preferably not more than 20% by mass and further even more preferably not more than 15% by mass form the viewpoint of stably emulsifying and dispersing the colored fine particles.

The content of the polymer in the colored fine particle dispersion is preferably not less than 1.0% by mass, more preferably not less than 3.0% by mass and even more preferably not less than 5.0% by mass form the viewpoint of improving storage stability and ejection stability of the resulting water-based ink and alcohol resistance of the resulting printed material, and is also preferably not more than 40% by mass, more preferably not more than 30% by mass, even more preferably not more than 20% by mass and further even more preferably not more than 10% by mass form the same viewpoint as described above.

The content of the neutralizing agent in the colored fine particle dispersion is preferably not less than 0.1% by mass, more preferably not less than 0.5% by mass and even more preferably not less than 0.7% by mass form the viewpoint of improving storage stability and ejection stability of the resulting water-based ink and alcohol resistance of the resulting printed material, and is also preferably not more than 10% by mass, more preferably not more than 5.0% by mass and even more preferably not more than 3.0% by mass form the same viewpoint as described above.

The mass ratio of the pigment to the polymer [pigment/polymer] in the colored fine particle dispersion is preferably not less than 0.1, more preferably not less than 0.2 and even more preferably not less than 0.4 form the viewpoint of enhancing optical density of the printed characters or images as well as form the viewpoint of suppressing increase in viscosity of the colored fine particle dispersion in association with increased concentration of the colored fine particle dispersion upon evaporation of water therefrom and improving storage stability and ejection stability of the resulting water-based ink and alcohol resistance of the resulting printed material, and is also preferably not more than 4.0, more preferably not more than 3.0 and even more preferably not more than 2.0 form the same viewpoint as described above.

(Properties of Colored Fine Particle Dispersion)

The average particle size of the colored fine particles in the colored fine particle dispersion as measured at 25° C. is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm form the viewpoint of suppressing increase in viscosity of the colored fine particle dispersion in association with increased concentration of the colored fine particle dispersion upon evaporation of water therefrom and improving storage stability and ejection stability of the resulting water-based ink and alcohol resistance of the resulting printed material, and is also preferably not more than 300 nm, more preferably not more than 200 nm, even more preferably not more than 160 nm, further even more preferably not more than 150 nm, still further even more preferably not more than 140 nm and still further even more preferably not more than 130 nm from the same viewpoint as described above. Meanwhile, the average particle size of the colored fine particles as measured at 25° C. may be measured by the method described in Examples below.

The pH value of the colored fine particle dispersion is controlled to not less than 6, preferably not less than 7, more preferably not less than 7.5 and even more preferably not less than 8 form the viewpoint of improving storage stability and ejection stability of the resulting water-based ink and alcohol resistance of the resulting printed material, and is also preferably controlled to not more than 11, preferably not more than 10, more preferably not more than 9.5 and even more preferably not more than 9 from the same viewpoint as described above. Meanwhile, the pH value of the colored fine particle dispersion may be measured by the method described in Examples below.

(Process for Producing Water-Based Ink for Ink-Jet Printing)

The colored fine particle dispersion of the present invention is preferably used as a colorant for a water-based ink for ink-jet printing (hereinafter also referred to merely as a "water-based ink" or an "ink") form the viewpoint of improving storage stability and ejection stability of the resulting water-based ink and alcohol resistance of the resulting printed material.

The aforementioned water-based ink is preferably produced by mixing the colored fine particle dispersion of the present invention and an organic solvent X form the viewpoint of improving ejection stability of the resulting water-based ink and alcohol resistance of the resulting printed material.

Examples of compounds that may be used as the organic solvent X include at least one compound selected from the group consisting of polyhydric alcohols, polyhydric alcohol alkyl ethers, nitrogen-containing heterocyclic compounds, amides, amines and sulfur-containing compounds. Among these compounds, form the viewpoint of improving ejection stability of the resulting water-based ink and alcohol resistance of the resulting printed material, preferred is at least one compound selected from the group consisting of polyhydric alcohols and polyhydric alcohol alkyl ethers, and more preferred is a combination of the polyhydric alcohol and the polyhydric alcohol alkyl ether. The polyhydric alcohols may be used in the form of a mixture containing a plurality of compounds belonging to the concept of polyhydric alcohols, and the polyhydric alcohol alkyl ethers may also be used in the form of a mixture containing a plurality of compounds belonging to the concept of polyhydric alcohol alkyl ethers.

The content of the at least one compound selected from the group consisting of polyhydric alcohols and polyhydric alcohol alkyl ethers in the organic solvent X is preferably not less than 80% by mass, more preferably not less than 90% by mass, even more preferably not less than 95% by mass, further even more preferably substantially 100% by mass and still further even more preferably 100% by mass.

When using the polyhydric alcohol in combination with the polyhydric alcohol alkyl ether, the mass ratio of the polyhydric alcohol to the polyhydric alcohol alkyl ether [polyhydric alcohol/polyhydric alcohol alkyl ether] is preferably from 50/50 to 95/5, more preferably from 60/40 to 90/10 and even more preferably from 70/30 to 85/15.

Examples of the polyhydric alcohols include ethylene glycol, diethylene glycol, triethylene glycol, polyethylene glycol, propylene glycol, dipropylene glycol and tripropylene glycol. Among these polyhydric alcohols, form the viewpoint of improving storage stability and ejection stability of the resulting water-based ink and alcohol resistance of the resulting printed material, preferred is propylene glycol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, diethylene glycol monoisobutyl ether, triethylene glycol monomethyl ether, triethylene glycol monobutyl ether, triethylene glycol monoisobutyl ether, tetraethylene glycol monomethyl ether, propylene glycol monoethyl ether, dipropylene glycol monobutyl ether, dipropylene glycol monomethyl ether, tripropylene glycol monomethyl ether and tripropylene glycol monobutyl ether. Among these polyhydric alcohol alky ethers, form the viewpoint of improving storage stability and ejection stability of the resulting water-based ink and alcohol resistance of the resulting printed material, preferred is diethylene glycol monoisobutyl ether.

As the organic solvent X, form the viewpoint of improving ejection stability of the resulting water-based ink, preferred is a combination of propylene glycol and diethylene glycol monoisobutyl ether.

The water-based ink may also be produced by further adding, in addition to the aforementioned organic solvent X, various ordinary additives such as a wetting agent, a penetrant, a dispersant, a surfactant, a viscosity controller, a defoaming agent, an antiseptic agent, a mildew-proof agent and a rust preventive to the colored fine particle dispersion.

(Amounts of Respective Components Compounded in Water-Based Ink)

The amount of the colored fine particle dispersion compounded in the water-based ink is preferably not less than 40% by mass, more preferably not less than 50% by mass and even more preferably not less than 60% by mass form the viewpoint of improving storage stability and ejection stability of the resulting water-based ink and alcohol resistance of the resulting printed material, and is also preferably not more than 80% by mass, more preferably not more than 75% by mass and even more preferably not more than 70% by mass form the same viewpoint as described above.

The amount of the organic solvent X compounded in the water-based ink is preferably not less than 10% by mass, more preferably not less than 15% by mass, even more preferably not less than 20% by mass and further even more preferably not less than 25% by mass form the viewpoint of improving ejection stability of the resulting water-based ink and alcohol resistance of the resulting printed material, and is also preferably not more than 50% by mass, more preferably not more than 45% by mass, even more preferably not more than 40% by mass and further even more preferably not more than 35% by mass form the same viewpoint as described above.

(Contents of Respective Components in Water-Based Ink)

The content of the pigment in the water-based ink is preferably not less than 1.0% by mass, more preferably not less than 1.5% by mass and even more preferably not less than 2.0% by mass from the viewpoint of enhancing optical density of the printed characters or images, and is also preferably not more than 15% by mass, more preferably not more than 10% by mass and even more preferably not more than 8.0% by mass form the viewpoint of improving storage stability and ejection stability of the resulting water-based ink and alcohol resistance of the resulting printed material.

The content of the polymer in the water-based ink is preferably not less than 0.5% by mass, more preferably not less than 0.8% by mass, even more preferably not less than 1.0% by mass and further even more preferably not less than 3.0% by mass form the viewpoint of improving storage stability and ejection stability of the resulting water-based ink and alcohol resistance of the resulting printed material, and is also preferably not more than 30% by mass, more preferably not more than 20% by mass and even more preferably not more than 10% by mass from the same viewpoint as described above.

The mass ratio of the pigment to the polymer [pigment/polymer] in the water-based ink is preferably not less than 0.1, more preferably not less than 0.2 and even more preferably not less than 0.4 from the viewpoint of enhancing optical density of the printed characters or images, and is also preferably not more than 4.0, more preferably not more than 3.0 and even more preferably not more than 2.0 form the viewpoint of improving storage stability and ejection stability of the resulting water-based ink and alcohol resistance of the resulting printed material.

The content of the neutralizing agent in the water-based ink is preferably not less than 0.1% by mass, more preferably not less than 0.2% by mass and even more preferably not less than 0.3% by mass form the viewpoint of improving storage stability and ejection stability of the resulting water-based ink and alcohol resistance of the resulting printed material, and is also preferably not more than 5.0% by mass, more preferably not more than 3.0% by mass, even more preferably not more than 1.0% by mass and further even more preferably not more than 0.5% by mass from the same viewpoint as described above.

The content of water in the water-based ink is preferably not less than 20% by mass, more preferably not less than 30% by mass and even more preferably not less than 40% by mass form the viewpoint of improving storage stability and ejection stability of the resulting water-based ink and alcohol resistance of the resulting printed material, and is also preferably not more than 75% by mass, more preferably not more than 70% by mass and even more preferably not more than 65% by mass form the viewpoint of improving ejection stability of the resulting water-based ink and alcohol resistance of the resulting printed material.

The content of the organic solvent X in the water-based ink is preferably not less than 10% by mass, more preferably not less than 15% by mass, even more preferably not less than 20% by mass and further even more preferably not less than 25% by mass form the viewpoint of improving ejection stability of the resulting water-based ink and alcohol resistance of the resulting printed material, and is also preferably not more than 50% by mass, more preferably not more than 45% by mass, even more preferably not more than 40% by mass and further even more preferably not more than 35% by mass from the same viewpoint as described above.

(Properties of Water-Based Ink)

The average particle size of the colored fine particles in the water-based ink as measured at 25° C. is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm form the viewpoint of improving storage stability and ejection stability of the resulting water-based ink and alcohol resistance of the resulting printed material, and is also preferably not more than 300 nm, more preferably not more than 200 nm, even more preferably not more than 160 nm, further even more preferably not more than 150 nm, still further even more preferably not more than 140 nm and still further even more preferably not more than 130 nm from the same viewpoint as described above. Meanwhile, the average particle size of the colored fine particles in the water-based ink as measured at 25° C. may be measured by the method described in Examples below.

The viscosity of the water-based ink as measured at 32° C. is preferably not less than 2.0 mPa·s, more preferably not less than 3.0 mPa·s and even more preferably not less than 4.0 mPa·s form the viewpoint of improving storage stability and ejection stability of the resulting water-based ink and alcohol resistance of the resulting printed material, and is also preferably not more than 12 mPa·s, more preferably not more than 9.0 mPa·s and even more preferably not more than 7.0 mPa·s from the same viewpoint as described above. Meanwhile, the viscosity of the water-based ink as measured at 32° C. may be measured by the method described in Examples below.

The static surface tension of the water-based ink as measured at 20° C. is preferably not less than 20 mN/m and more preferably not less than 25 mN/m form the viewpoint of improving ejection properties of the resulting water-based ink, and is also preferably not more than 50 mN/m, more preferably not more than 45 mN/m, even more preferably not more than 40 mN/m, further even more preferably not more than 35 mN/m and still further even more preferably not more than 30 mN/m from the same viewpoint as described above. Meanwhile, the static surface tension of the water-based ink as measured at 20° C. may be measured by the method described in Examples below.

The pH value of the water-based ink is preferably not less than 6.0, more preferably not less than 7.0, even more preferably not less than 7.5 and further even more preferably not less than 8.0 form the viewpoint of improving storage stability and ejection stability of the resulting water-based ink and alcohol resistance of the resulting printed material, and is also preferably not more than 11.0, more preferably not more than 10.0, even more preferably not more than 9.5 and further even more preferably not more than 9.0 from the viewpoint of improving the resistance of members to the water-based ink and suppressing skin irritation. Meanwhile, the pH value of the water-based ink may be measured by the method described in Examples below.

(Ink-Jet Printing Method)

The aforementioned water-based ink may be used in an ink-jet printing method in which characters or images are printed on a printing medium such as a plain paper or an ink-jet paper. In addition, the water-based ink is preferably used in an ink-jet printing method in which characters or images are printed on a low-water absorbing printing medium, because of excellent alcohol resistance of the water-based ink.

As the method of ejecting the water-based ink in an ink-jet printing apparatus, there may be mentioned ink-ejecting methods using a thermal-type ink-jet print head or a piezoelectric-type ink-jet print head. In the present invention, there is preferably used the method in which the ink is ejected and printed by using a piezoelectric-type ink-jet print head.

The water absorption of the low-water absorbing printing medium used in the present invention as measured by contacting the printing medium with pure water for 100 milliseconds is preferably not less than 0 g/m$^2$, more preferably not less than 1.0 g/m$^2$ and even more preferably not less than 2.0 g/m$^2$ from the viewpoint of promoting drying of the printed characters or images and improving alcohol resistance of the water-based ink, and is also preferably not more than 10 g/m$^2$, more preferably not more than 8.0 g/m$^2$, even more preferably not more than 6.0 g/m$^2$ and further even more preferably not more than 4.0 g/m$^2$ from the viewpoint of enhancing optical density and gloss of the printed characters or images. The aforementioned water absorption of the low-water absorbing printing medium may be measured using an automatic scanning absorptometer by the method described in Examples below.

As the low-water absorbing printing medium for ink-jet printing, from the viewpoint of improving alcohol resistance of the water-based ink, there may be preferably used a coated paper or a synthetic resin film, and more preferably a synthetic resin film.

Examples of the coated paper include "OK Topcoat Plus" (basis weight: 104.7 g/m$^2$; 60° gloss: 49.0; water absorption as measured in a pure water contacting time of 100 milliseconds (hereinafter defined in the same way): 4.9 g/m$^2$) available from Oji Paper Co., Ltd., a multi-color foam glossy coated paper (104.7 g/m$^2$; 60° gloss: 36.8; water absorption: 5.2 g/m$^2$) available from Oji Paper Co., Ltd., "UPM Finesse Gloss" (115 g/m$^2$; 60° gloss: 27.0; water absorption: 3.1 g/m$^2$) available from UPM, "UPM Finesse Matt" (115 g/m$^2$; 60° gloss: 5.6; water absorption: 4.4 g/m$^2$) available from UPM, "Terra Press Silk" (80 g/m$^2$; 60° gloss: 6.0; water absorption: 4.1 g/m$^2$) available from Stora Enso, and "Lumi Art" (90 g/m$^2$; 60° gloss: 26.3) available from Stora Enso.

Examples of the synthetic resin film include a polyester film, a polyvinyl chloride film, a polypropylene film, a polyethylene film and a nylon film. These films may be subjected to surface treatments such as corona treatment, etc., if required.

Examples of the generally available synthetic resin films include "LUMIRROR T60" (polyethylene terephthalate; 60° gloss: 189.1; water absorption: 2.3 g/m$^2$) available from Toray Industries Inc., "PVC80B P" (polyvinyl chloride; 60° gloss: 58.8; water absorption: 1.4 g/m$^2$) available from Lintec Corporation, "KINATH KEE 70CA" (polyethylene) available from Lintec Corporation, "YUPO SG90 PAT1" (polypropylene) available from Lintec Corporation, "BONYL RX" (nylon) available from Kohjin Film & Chemical Co., Ltd., and "TETRON U2" (white polyester film) available from Teijin DuPont Films Japan Ltd.

With respect to the aforementioned embodiments, the present invention further provides the following aspects relating to the colored fine particle dispersion and the process for producing the colored fine particle dispersion.

<1> A colored fine particle dispersion containing colored fine particles and a neutralizing agent, in which the colored fine particles are produced by subjecting a monomer mixture containing an acid group-containing polymerizable monomer to emulsion polymerization in the presence of a pigment; the neutralizing agent contains a water-soluble amine compound; and the colored fine particle dispersion has a pH value of not less than 6 and not more than 11.

<2> The colored fine particle dispersion according to the aspect <1>, wherein the pigment is a pigment subjected to no hydrophilic treatment.

<3> The colored fine particle dispersion according to the aspect <1> or <2>, wherein the acid group is a carboxy group.

<4> The colored fine particle dispersion according to any one of the aspects <1> to <3>, wherein the acid group-containing polymerizable monomer is at least one monomer selected from the group consisting of (meth)acrylic acid, maleic acid, itaconic acid, fumaric acid and crotonic acid.

<5> The colored fine particle dispersion according to any one of the aspects <1> to <4>, wherein a content of the acid group-containing polymerizable monomer in the monomer mixture is preferably not less than 1% by mass, more preferably not less than 3% by mass, even more preferably not less than 5% by mass and further even more preferably not less than 7% by mass, and is also preferably not more than 20% by mass, more preferably not more than 15% by mass and even more preferably not more than 10% by mass.

<6> The colored fine particle dispersion according to any one of the aspects <1> to <5>, wherein the monomer mixture further contains a hydrophobic polymerizable monomer, and the hydrophobic polymerizable monomer is at least one monomer selected from the group consisting of a (meth)acrylate and an aromatic ring-containing hydrophobic monomer.

<7> The colored fine particle dispersion according to the aspect <6>, wherein the (meth)acrylate is at least one compound selected from the group consisting of methyl (meth)acrylate, ethyl (meth)acrylate and 2-ethylhexyl (meth)acrylate.

<8> The colored fine particle dispersion according to the aspect <6> or <7>, wherein the aromatic ring-containing hydrophobic monomer is at least one monomer selected from the group consisting of a styrene-based monomer and an aromatic group-containing (meth) acrylate.

<9> The colored fine particle dispersion according to any one of the aspects <6> to <8>, wherein a content of the hydrophobic polymerizable monomer in the monomer mixture is preferably not less than 80% by mass, more preferably not less than 85% by mass and even more preferably not less than 90% by mass, and is also preferably not more than 99% by mass, more preferably not more than 97% by mass, even more preferably not more than 95% by mass and further even more preferably not more than 93% by mass.

<10> The colored fine particle dispersion according to any one of the aspects <1> to <9>, wherein the number of carbon atoms in the water-soluble amine compound is preferably not less than 2, more preferably not less than 3 and even more preferably not less than 4, and is also preferably not more than 8, more preferably not more than 6 and even more preferably not more than 5.

<11> The colored fine particle dispersion according to any one of the aspects <1> to <10>, wherein the water-soluble amine compound is preferably an alkanolamine having not less than 2 and not more than 8 carbon atoms, more preferably at least one compound selected from the group consisting of N-dimethylaminoethanol, N-methyldiethanolamine, diethanolamine and triethanolamine, even more preferably at least one compound selected from the group consisting of N-dimethylaminoethanol and N-methyldiethanolamine, and further even more preferably N-dimethylaminoethanol.

<12> The colored fine particle dispersion according to any one of the aspects <1> to <10>, wherein the water-soluble amine compound is preferably at least one compound selected from the group consisting of N-methyldiethanolamine, diethanolamine and triethanolamine, and more preferably N-methyldiethanolamine.

<13> The colored fine particle dispersion according to any one of the aspects <1> to <12>, wherein a content (solid content) of the colored fine particles in the colored fine particle dispersion is preferably not less than 5% by mass, more preferably not less than 10% by mass and even more preferably not less than 15% by mass, and is also preferably not more than 60% by mass, more preferably not more than 50% by mass, even more preferably not more than 40% by mass and further even more preferably not more than 30% by mass.

<14> The colored fine particle dispersion according to any one of the aspects <1> to <13>, wherein a content of the pigment in the colored fine particle dispersion is preferably not less than 1.0% by mass, more preferably not less than 3.0% by mass, even more preferably not less than 5.0% by mass and further even more preferably not less than 7.0% by mass, and is also preferably not more than 40% by mass, more preferably not more than 30% by mass, even more preferably not more than 20% by mass and further even more preferably not more than 15% by mass.

<15> The colored fine particle dispersion according to any one of the aspects <1> to <14>, wherein a content of the polymer in the colored fine particle dispersion is preferably not less than 1.0% by mass, more preferably not less than 3.0% by mass and even more preferably not less than 5.0% by mass, and is also preferably not more than 40% by mass, more preferably not more than 30% by mass, even more preferably not more than 20% by mass and further even more preferably not more than 10% by mass.

<16> The colored fine particle dispersion according to any one of the aspects <1> to <15>, wherein a content of the neutralizing agent in the colored fine particle dispersion is preferably not less than 0.1% by mass, more preferably not less than 0.5% by mass and even more preferably not less than 0.7% by mass, and is also preferably not more than 10% by mass, more preferably not more than 5.0% by mass and even more preferably not more than 3.0% by mass.

<17> The colored fine particle dispersion according to any one of the aspects <1> to <16>, wherein an average particle size of the colored fine particles in the colored fine particle dispersion as measured at 25° C. is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm, and is also preferably not more than 300 nm, more preferably not more than 200 nm, even more preferably not more than 160 nm, further even more preferably not more than 150 nm, still further even more preferably not more than 140 nm and still further even more preferably not more than 130 nm.

<18> The colored fine particle dispersion according to any one of the aspects <1> to <17>, wherein a pH value of the colored fine particle dispersion is controlled to not less than 6, preferably not less than 7, more preferably not less than 7.5 and even more preferably not less than 8, and is also controlled to not more than 11, preferably not more than 10, more preferably not more than 9.5 and even more preferably not more than 9.

<19> The colored fine particle dispersion according to any one of the aspects <1> to <18>, wherein the colored fine particle dispersion is used in a water-based ink for ink-jet printing.

<20> A process for producing a colored fine particle dispersion containing colored fine particles and a neutralizing agent, said process including the following steps 1 and 2:

Step 1: subjecting a monomer mixture containing an acid group-containing polymerizable monomer to emulsion polymerization in the presence of a pigment to obtain a colored fine particle dispersion (p); and Step 2: mixing the colored fine particle dispersion (p) and the neutralizing agent containing a water-soluble amine compound to obtain the colored fine particle dispersion having a pH value of not less than 6 and not more than 11.

<21> The process for producing a colored fine particle dispersion according to the aspect <20>, wherein the step 1 preferably includes the following steps 1a and 1b:

Step 1a: dispersing a mixed solution containing the pigment, a surfactant (a) and water to obtain a pigment dispersion (a): and Step 1b: mixing the pigment dispersion (a) and the monomer mixture containing the acid group-containing polymerizable monomer and subjecting the resulting mixture to emulsion polymerization to obtain the colored fine particle dispersion (p).

<22> The process for producing a colored fine particle dispersion according to the aspect <21>, wherein the surfactant (a) contains a polymerizable surfactant.

<23> The process for producing a colored fine particle dispersion according to the aspect <22>, wherein the polymerizable surfactant is at least one surfactant selected from the group consisting of sulfosuccinic acid ester-based surfactants, alkylphenolether-based polymerizable group-containing surfactants and polyoxyethylene-based polymerizable group-containing surfactants.

<24> The process for producing a colored fine particle dispersion according to any one of the aspects <21> to <23>, wherein an amount of the surfactant (a) used in the step 1a is preferably not less than 1 part by mass, more preferably not less than 5 parts by mass and even more preferably not less than 8 parts by mass, and is also preferably not more than 50 parts by mass, more preferably not more than 30 parts by mass, even more preferably not more than 20 parts by mass and further even more preferably not more than 15 parts by mass, on the basis of 100 parts by mass of the pigment.

<25> The process for producing a colored fine particle dispersion according to any one of the aspects <21> to <24>, wherein in the step 1a, the mixed solution further contains an organic solvent (a).

<26> The process for producing a colored fine particle dispersion according to the aspect <25>, wherein a mass ratio of the organic solvent (a) to water (organic solvent (a)/water) in the mixed solution is preferably not less than 0.05, more preferably not less than 0.08, even more preferably not less than 0.10 and further even more preferably not less than 0.12, and is also preferably not more than 0.40, more preferably not more than 0.35, even more preferably not more than 0.30 and further even more preferably not more than 0.25.

<27> The process for producing a colored fine particle dispersion according to the aspect <25> or <26>, wherein the step 1a further includes the step of removing the organic solvent (a) from the dispersion obtained after the dispersion treatment to obtain the pigment dispersion (a).

<28> The process for producing a colored fine particle dispersion according to any one of the aspects <21> to <27>, wherein in the step 1b, a surfactant (b) is further added in addition to the surfactant (a) used in the step 1a.

<29> The process for producing a colored fine particle dispersion according to the aspect <28>, wherein an amount of the surfactant (b) used in the step 1b is preferably not less than 0.5 part by mass, more preferably not less than 1 part by mass and even more preferably not less than 2 parts by mass, and is also preferably not more than 20 parts by mass, more preferably not more than 10 parts by mass and even more preferably not more than 5 parts by mass, on the basis of 100 parts by mass of the monomer mixture used in the emulsion polymerization of the step 1b.
<30> The process for producing a colored fine particle dispersion according to any one of the aspects <21> to <29>, wherein in the step 1b, a polymerization initiator is added to the reaction system.
<31> The process for producing a colored fine particle dispersion according to the aspect <30>, wherein an amount of the polymerization initiator added is preferably not less than 0.01 part by mass, more preferably not less than 0.05 part by mass and even more preferably not less than 0.1 part by mass, and is also preferably not more than 5 parts by mass, more preferably not more than 3 parts by mass and even more preferably not more than 1 part by mass, on the basis of 100 parts by mass of the monomer mixture.
<32> The process for producing a colored fine particle dispersion according to any one of the aspects <21> to <31>, wherein the step 1b is the step of adding a pre-emulsion that contains the monomer mixture containing the acid group-containing polymerizable monomer, the surfactant (b) and water to the pigment dispersion (a) and subjecting the resulting mixture to emulsion polymerization.
<33> The process for producing a colored fine particle dispersion according to any one of the aspects <20> to <32>, wherein an amount of the monomer mixture used is preferably not less than 1.0% by mass, more preferably not less than 5.0% by mass and even more preferably not less than 8.0% by mass, and is also preferably not more than 60% by mass, more preferably not more than 40% by mass and even more preferably not more than 20% by mass, on the basis of a whole reaction system used in the emulsion polymerization reaction.
<34> The process for producing a colored fine particle dispersion according to any one of the aspects <20> to <33>, wherein a mass ratio of the monomer mixture to the pigment (monomer mixture/pigment) upon the emulsion polymerization is preferably from 90/10 to 10/90, more preferably from 80/20 to 20/80 and even more preferably from 75/25 to 25/75.
<35> The process for producing a colored fine particle dispersion according to any one of the aspects <20> to <34>, wherein the step 2 is carried out such that the pH value of the obtained colored fine particle dispersion is not less than 6, preferably not less than 7, more preferably not less than 7.5 and even more preferably not less than 8, and is also not more than 11, preferably not more than 10, more preferably not more than 9.5 and even more preferably not more than 9.
<36> The process for producing a colored fine particle dispersion according to any one of the aspects <20> to <35>, wherein the acid group is a carboxy group.
<37> The process for producing a colored fine particle dispersion according to any one of the aspects <20> to <36>, wherein the water-soluble amine compound is a compound having not less than 2 and not more than 8 carbon atoms.
<38> A colored fine particle dispersion that is produced by the process according to any one of the aspects <20> to <37>.

<39> A use of the colored fine particle dispersion according to any one of the aspects <1> to <18> and <38> as a colorant for a water-based ink for ink-jet printing.

EXAMPLES

In the following Production Examples, Examples and Comparative Examples, the "part(s)" and "%" indicate "part(s) by mass" and "% by mass", respectively, unless otherwise specified.
(1) Measurement of Average Particle Sizes of Colored Fine Particles in Pigment Dispersion, Colored Fine Particle Dispersion and Water-Based Ink The average particle size of the particles dispersed in the respective dispersions and ink was measured using a laser particle analyzing system "ELS-8000" (cumulant analysis) available from Otsuka Electronics Co., Ltd. The measurement was conducted under the conditions including a temperature of 25° C., an angle between incident light and a detector of 90° and a cumulative number of 100 times, and a refractive index of water (1.333) was input to the analyzing system as a refractive index of the dispersing medium. In the measurement, the concentration of the dispersion to be measured was adjusted to $5 \times 10^{-3}$% by weight (in terms of a solid content of the dispersion).
(2) Measurement of Solid Contents of Pigment Dispersion and Colored Fine Particle Dispersion Using an infrared moisture meter "FD-230" (tradename) available from Kett Electric Laboratory, 5 g of an aqueous dispersion to be measured was dried at a drying temperature of 150° C. under a measuring mode 96 (monitoring time: 2.5 minutes/variation range: 0.05%) to measure a water content on a wet base (%) of the aqueous dispersion. The solid content of the aqueous dispersion was calculated according to the following formula:

Solid Content (%)=100−Water Content on Wet Base (%) of Aqueous Dispersion (3) Measurement of Viscosity of Water-Based Ink The viscosity of the water-based ink was measured at 32° C. using an E-type viscometer "Model No. TV-25" (using a standard cone rotor (1° 34'×R24); rotating speed: 50 rpm) available from Toki Sangyo Co., Ltd. The data obtained in this measurement were used as data for the below-mentioned storage stability test.
(4) Measurement of Static Surface Tension of Water-Based Ink A platinum plate was dipped in 5 g of the water-based ink adjusted to a temperature of 20° C. and filled in a cylindrical polyethylene vessel (3.6 cm in diameter×1.2 cm in depth), and the static surface tension of the water-based ink was measured using a surface tension meter "CBVP-Z" available from Kyowa Interface Science Co., Ltd., by Wilhelmy method.
(5) Measurement of pH Values of Colored Fine Particle Dispersion and Water-Based Ink The pH values of the colored fine particle dispersion and the water-based ink were measured at 25° C. using a bench-top pH meter "F-71" available from Horiba Ltd., equipped with a pH electrode "6337-10D" available from Horiba Ltd.
(6) Water Absorption of Printing Medium The water absorption of the printing medium as measured by contacting the printing medium with pure water for 100 milliseconds was determined as follows. That is, using an automatic scanning absorptometer "KM500win" available from Kumagai Riki Kogyo Co., Ltd., an amount of pure water transferred to the printing medium when allowing the printing medium to contact with pure water at 23° C. under a relative humidity of 50% RH for 100 milliseconds was measured. The thus measured amount of pure water transferred to the printing medium was determined as the water absorption of the printing medium. The measuring conditions are as follows.

"Spiral Method"
  Contact time: 0.010 to 1.0 (sec)
  Pitch (mm): 7
  Length Per Sampling (degree): 86.29
  Start Radius (mm): 20
  End Radius (mm): 60
  Min Contact Time (ms): 10
  Max Contact Time (ms): 1000
  Sampling Pattern (1-50): 50
  Number of Sampling Points (>0): 19
"Square Head"
  Split Span (mm): 1
  Split Width (mm): 5

Examples 1-1 to 1-8

<Production of Colored Fine Particle Dispersion by Emulsion Polymerization>
(Step 1a: Pigment Dispersing Step)

A 5 L polyethylene reaction vessel was charged with a polymerizable surfactant "LATEMUL PD-104" (tradename; ammonium polyoxyalkylene alkenyl ether sulfate; solid content; 20%) available from Kao Corporation, ion-exchanged water, methyl ethyl ketone and a pigment as shown in "Step 1a; Charged Composition for Pigment Dispersion (a)" in Table 1-1, and the contents of the polyethylene reaction vessel were subjected to dispersion treatment using "ROBOMICS" available from PRIMIX Corporation equipped with a homodisper at an operating speed of 4000 rpm for 2 hours while cooling in an ice bath at 0° C. Then, the obtained mixture was further subjected to dispersion treatment under a pressure of 150 MPa by passing through a Microfluidizer "Model No. M-110EH-30XP" (tradename) available from Microfluidics Corporation 15 times. The resulting dispersion was concentrated under reduced pressure at 60° C. using an evaporator to remove methyl ethyl ketone therefrom, and then ion-exchanged water was added to the dispersion to control a solid content of the dispersion to a predetermined value, thereby obtaining a pigment dispersion (a) (solid content: 30%). The average particle size of pigment particles contained in the thus obtained pigment dispersion (a) is shown in Table 1-1.

Meanwhile, all of the pigments shown in Table 1-1 were in the form of a pigment subjected to no hydrophilic treatment.

(Step 1b; Step of Producing Colored Fine Particle Dispersion (p))

Separately, a glass reaction vessel was charged with a vinyl-based monomer, a surfactant "LATEMUL E-118B" (tradename; sodium polyoxyethylene alkyl ether sulfate; solid content: 26%) available from Kao Corporation and ion-exchanged water as shown in "Charged Composition for Pre-Emulsion" in Table 1-2, and the contents of the glass reaction vessel were stirred using a Teflon (registered trademark) stirring blade at 500 rpm for 30 minutes, thereby obtaining a pre-emulsion.

A 1 L separable flask was charged with the pigment dispersion (a), an anionic azo-based polymerization initiator "V-501" (tradename; 4,4'-azobis(4-cyanovaleric acid)) available from Wako Pure Chemical Industries, Ltd., and ion-exchanged water as shown in "Step 1b: Charged Composition for Colored Fine Particle Dispersion (p)" in Table 1-3, and the contents of the flask were heated to 80° C. in a hot water bath while stirring at 250 rpm. After the temperature of the dispersion in the flask reached 80° C., a whole amount of the pre-emulsion previously prepared above as shown in Table 1-2 was added dropwise thereinto over 2 hours. After completion of the dropwise addition of the pre-emulsion, the resulting mixture was aged at 80° C. for 2 hours, thereby obtaining a colored fine particle dispersion (p). Respective properties of the thus obtained colored fine particle dispersion (p) are shown in Table 1-3.

(Step 2: Neutralization Step)

A glass reaction vessel was charged with the colored fine particle dispersion (p), a neutralizing agent and ion-exchanged water as shown in Table 3, and the contents of the glass reaction vessel were stirred for 10 minutes using a magnetic stirrer, thereby obtaining colored fine particle dispersions P-1 to P-8 according to the present invention. Respective properties of the thus obtained colored fine particle dispersions are shown in Table 3. In addition, the colored fine particles contained in the colored fine particle dispersion P-1 were observed by a scanning electron microscope. As a result, it was confirmed that the respective pigment particles in the dispersion were coated with the polymer.

TABLE 1-1

Step 1a (Charged Composition for Pigment Dispersion (a)) and Evaluation Results

| | No. of pigment dispersion (a) | | a-1 | a-2 | a-3 |
|---|---|---|---|---|---|
| Charged composition for pigment dispersion (a) | "LATEMUL PD-104"[1] | part(s) by mass | 444.0 | 444.0 | 444.0 |
| | Ion-exchanged water | part(s) by mass | 1963.0 | 1963.0 | 1963.0 |
| | Methyl ethyl ketone | part(s) by mass | 348.0 | 348.0 | 348.0 |
| | Pigment (P.B. 15-3) | part(s) by mass | 800.0 | — | — |
| | Pigment (P.Y. 83) | part(s) by mass | — | 800.0 | — |
| | Pigment (P.R. 150) | part(s) by mass | — | — | 800.0 |
| Properties of pigment dispersion (a) | Average particle size | nm | 92.0 | 123.0 | 149.0 |
| | Solid content | % | 30.0 | 30.0 | 30.0 |

Note:
*[1]"LATEMUL PD-104" was used in the form of an aqueous solution having a solid content of 20% by mass.

TABLE 1-2

Charged Composition for Pre-Emulsion

| | No. of pre-emulsion | | EC-1 | EC-2 | EC-3 |
|---|---|---|---|---|---|
| Charged composition for pre-emulsion (*2) | Methacrylic acid | part(s) by mass (% by mass) | 11.67 (10.0) | 9.72 (5.0) | 11.67 (10.0) |
| | Methyl methacrylate | part(s) by mass (% by mass) | 46.67 (40.0) | — | 81.67 (70.0) |
| | 2-Ethylhexyl acrylate | part(s) by mass (% by mass) | — | 48.61 (25.0) | 23.33 (20.0) |
| | Benzyl methacrylate | part(s) by mass (% by mass) | 58.33 (50.0) | 136.11 (70.0) | — |

TABLE 1-2-continued

Charged Composition for Pre-Emulsion

| No. of pre-emulsion | | EC-1 | EC-2 | EC-3 |
|---|---|---|---|---|
| "LATEMUL E-118B"*[3] | part(s) by mass | 13.46 | 22.44 | 13.46 |
| Ion-exchanged water | part(s) by mass | 54.21 | 90.34 | 54.21 |

Note:
*[2] The numeral values in parentheses indicate ratios (% by mass) of the polymerizable monomers on the basis of a whole amount of the monomer mixture.
*[3] "LATEMUL E-118B" was used in the form of an aqueous solution having a solid content of 26% by mass.

TABLE 1-3

Step 1b (Charged Composition for Colored Fine Particle Dispersion (p)) and Evaluation Results

| | | | No. of colored fine particle dispersion (p) | | | | |
|---|---|---|---|---|---|---|---|
| | | | ECC-1 | ECC-2 | ECC-3 | ECY-1 | ECM-1 |
| Charged composition | Pre-emulsion | No. | EC-1 | EC-2 | EC-3 | EC-1 | EC-1 |
| | Pigment dispersion (a) | No. | a-1 | a-1 | a-1 | a-2 | a-3 |
| | | part(s) by mass | 777.8 | 518.5 | 777.8 | 777.8 | 777.8 |
| | Polymerization initiator (V-501) | part(s) by mass | 1.17 | 1.94 | 1.17 | 1.17 | 1.17 |
| | Ion-exchanged water | part(s) by mass | 38.8 | 175.8 | 38.8 | 38.8 | 38.8 |
| Properties of colored fine particle dispersion (p) obtained | Average particle size | nm | 103.0 | 118.0 | 105.0 | 129.0 | 160.0 |
| | Solid content | % | 35.4 | 35.7 | 35.4 | 35.4 | 35.4 |
| | Content of pigment | % | 21.0 | 14.0 | 21.0 | 21.0 | 21.0 |
| | Content of polymer | % | 14.4 | 21.7 | 14.4 | 14.4 | 14.4 |

Comparative Examples 1-1 to 1-3

The same procedures as in Example 1-1, Example 1-5 and Example 1-6 were repeated except that the neutralizing agent used in the step 2 as well as its amount were changed to those shown in Table 3, thereby obtaining colored fine particle dispersions PC-1, PC-2 and PC-3. Properties of the thus obtained colored fine particle dispersions are shown in Table 3.

Comparative Examples 1-4

<Production of Colored Fine Particle Dispersion Using Polymer Dispersant>
(Pigment Dispersing Step Using Polymer Dispersant)

A 5 L polyethylene reaction vessel was charged with a polymer dispersant "JONCRYL 690" (tradename; acrylic resin) available from BASF Japan, Ltd., N-methyldiethanolamine, ion-exchanged water, methyl ethyl ketone and a pigment as shown in "Charged Composition for Pigment Dispersion (a')" in Table 2-1, and the contents of the polyethylene reaction vessel were subjected to dispersion treatment using "ROBOMICS" available from PRIMIX Corporation equipped with a homodisper at a rotating speed of 4000 rpm for 2 hours while cooling in an ice bath at 0° C. Then, the obtained mixture was further subjected to dispersion treatment under a pressure of 150 MPa by passing through a Microfluidizer "Model No. M-110EH-30XP" (tradename) available from Microfluidics Corporation 15 times. The resulting dispersion was maintained under reduced pressure at 60° C. using an evaporator to remove methyl ethyl ketone therefrom, and concentrated until reaching a predetermined solid content, thereby obtaining a pigment dispersion (a') (solid content: 25%). The average particle size of pigment particles contained in the thus obtained pigment dispersion (a') is shown in Table 2-1.

(Crosslinking Step Using Crosslinking Agent)

A 1 L separable flask was charged with the pigment dispersion (a'), "DENACOL EX 321L" (tradename; trimethylolpropane polyglycidyl ether; epoxy equivalent: 129) as a crosslinking agent available from Nagase ChemteX Corporation and ion-exchanged water as shown in "Charged Composition for Colored Fine Particle Dispersion (p')" in Table 2-2. The contents of the flask were heated to 70° C. in a hot water bath while stirring at 100 rpm, and allowed to react at 70° C. for 5 hours, thereby obtaining a colored fine particle dispersion (p') containing crosslinked polymer particles (solid content: 25%). The average particle size of the particles in the thus obtained colored fine particle dispersion (p') is shown in Table 2-2.

(Neutralization Step)

A glass reaction vessel was charged with the colored fine particle dispersion, a neutralizing agent and ion-exchanged water as shown in Table 3, and the contents of the glass reaction vessel were stirred for 10 minutes using a magnetic stirrer, thereby obtaining a colored fine particle dispersion PC-4. Respective properties of the thus obtained colored fine particle dispersion are shown in Table 3.

TABLE 2-1

Charged Composition for Pigment Dispersion (a') and Evaluation Results (Pigment Dispersing Step)

| | | No. of pigment dispersion | a' |
|---|---|---|---|
| Charged composition for pigment dispersion (a') (part(s) by mass) | Preliminary dispersing step | JONCRYL 690 | 266.7 |
| | | N-methyldiethanolamine | 67.9 |
| | | Ion-exchanged water | 1716.8 |
| | | Methyl ethyl ketone | 515.1 |
| | | Pigment (P.B. 15:3) | 400.0 |

TABLE 2-1-continued

Charged Composition for Pigment Dispersion (a') and Evaluation
Results (Pigment Dispersing Step)

| No. of pigment dispersion | a' |
|---|---|
| High-pressure dispersing step  Ion-exchanged water | 835.2 |
| Average particle size of particles in pigment dispersion (a') (nm) | 101.0 |
| Content of pigment (%) | 15.0 |
| Solid content (%) | 25.0 |

TABLE 2-2

Charged Composition for Colored Fine Particle Dispersion (p') and
Evaluation Results (Crosslinking Step)

| No. of colored fine particle dispersion (p') | | ECC-4 |
|---|---|---|
| Charged composition (part(s) by mass) | Crosslinking step  Pigment dispersion (a') | 500.0 |
| | DENACOL EX-321L | 6.2 |
| | Ion-exchanged water | 17.6 |
| Average particle size of particles in colored fine particle dispersion (p') (nm) | | 103.0 |
| Solid content (%) | | 25.0 |
| Content of pigment (%) | | 13.8 |
| Content of polymer (%) | | 11.2 |

2-9, no diethylene glycol monoisobutyl ether was added, and a whole amount of the diethylene glycol monoisobutyl ether was replaced with propylene glycol to obtain the mixture.

Next, while stirring the respective colored fine particle dispersions obtained in Examples 1-1 to 1-8 and Comparative Examples 1-1 to 1-4, the mixture Q was added thereto, and the resulting mixture was continuously stirred as such for 1 hour. Thereafter, the mixture was subjected to filtration through a 5 μm disposable membrane filter "Minisart" available from Sartorius Inc., thereby obtaining respective water-based inks. Properties of the thus obtained water-based inks are shown in Table 4.

<Evaluation of Water-Based Ink>

Using the water-based inks prepared above, ink-jet printed materials were produced as shown in the following item (1), and the alcohol resistance thereof was evaluated by the method described in the following item (2). In addition, the water-based inks prepared above were evaluated with respect to ejection stability as shown in the following item (3) and storage stability as shown in the following item (4). The results are shown in Table 4.

(1) Production of Ink-Jet Printed Materials

The respective water-based inks as shown in Table 4 were loaded to a print evaluation apparatus available from Trytech Co., Ltd., equipped with an ink-jet print head "KJ4B-HD06MHG-STDV" (piezoelectric type) available from Kyocera Corporation under the environmental conditions of a temperature of 25±1° C. and a relative humidity of 30±5%. The operating conditions of the print evaluation apparatus

TABLE 3

| | | Step 2 | | | | | | | | | | | |
|---|---|---|---|---|---|---|---|---|---|---|---|---|---|
| | | Examples | | | | | | | | Comparative Examples | | | |
| | | 1-1 | 1-2 | 1-3 | 1-4 | 1-5 | 1-6 | 1-7 | 1-8 | 1-1 | 1-2 | 1-3 | 1-4 |
| Colored fine particle dispersion (p) | No. | ECC-1 | ECC-1 | ECC-1 | ECC-1 | ECC-2 | ECC-3 | ECY-1 | ECM-1 | ECC-1 | ECC-2 | ECC-3 | ECC-4 |
| | part(s) by mass | 16.64 | 16.64 | 16.64 | 16.64 | 16.87 | 16.64 | 16.64 | 16.64 | 16.64 | 16.87 | 16.64 | 23.33 |
| N-dimethylaminoethanol | part(s) by mass | 0.20 | | | | | | | | | | | |
| N-methyldiethanolamine | part(s) by mass | | 0.22 | | | 0.29 | 0.22 | 0.22 | 0.22 | | | | 0.10 |
| Diethanolamine | part(s) by mass | | | 0.16 | | | | | | | | | |
| Triethanolamine | part(s) by mass | | | | 0.22 | | | | | | | | |
| 1N NaOH aqueous solution | part(s) by mass | | | | | | | | | 0.59 | 0.49 | 0.59 | |
| Ion-exchanged water | part(s) by mass | 17.41 | 17.39 | 17.45 | 17.39 | 17.09 | 17.39 | 17.39 | 17.39 | 17.02 | 17.12 | 17.02 | 10.82 |
| Colored fine particle dispersion | No. | P-1 | P-2 | P-3 | P-4 | P-5 | P-6 | P-7 | P-8 | PC-1 | PC-2 | PC-3 | PC-4 |
| | Average particle size  nm | 104.0 | 105.0 | 104.0 | 103.0 | 119.0 | 107.0 | 130.0 | 162.0 | 109.0 | 124.0 | 108.0 | 108.0 |
| | pH | — | 9.00 | 8.88 | 8.65 | 8.10 | 8.95 | 8.99 | 8.78 | 8.69 | 8.65 | 8.75 | 8.77 | 8.45 |

Examples 2-1 to 2-9 and Comparative Examples
2-1 to 2-4

<Preparation of Water-Based Ink>

A glass reaction vessel was charged with propylene glycol, diethylene glycol monoisobutyl ether, a polyether-modified silicone "KF-6011" available from Shin-Etsu Chemical Industry Co., Ltd., and an acetylene-based surfactant "SUR-FYNOL 440" available from Nissin Chemical Industry Co., Ltd., as shown in Table 4, and the contents of the glass reaction vessel were stirred for 10 minutes using a magnetic stirrer, thereby obtaining a mixture Q. However, in Example were set to a head voltage of 26 V, a frequency of 20 kHz, an ejected ink droplet amount of 7 pL, a head temperature of 32° C., a resolution of 600 dpi, a number of ink shots for flashing before being ejected, of 200 shots and a negative pressure of −4.0 kPa. A polyester film "LUMIRROR T60" (thickness: 75 gm; water absorption: 2.3 g/m$^2$) as a printing medium available from Toray Industries Inc., was fixed on a transportation table under reduced pressure such that the longitudinal direction of the polyester film was aligned with a transporting direction thereof. A printing command was transmitted to the aforementioned print evaluation apparatus to print images with Duty 100% on the printing medium.

After completion of the printing, the resulting printed materials were heated and dried on a hot plate at 60° C. for 10 minutes.

(2) Evaluation of Alcohol Resistance

Ethanol was diluted with ion-exchanged water to prepare evaluation solutions that were different in ethanol weight concentration from each other (ethanol concentrations of the resulting evaluation solutions were varied at the intervals of 5% from 0%). A cotton swab (natural cotton: 100%) available from Johnson & Johnson K. K., was dipped in each of the thus prepared ethanol aqueous solutions (having respective ethanol weight concentrations). Then, the ink-jet printed material obtained above was rubbed with the cotton swab by moving the cotton swab over the printed surface thereof by 10 reciprocative motions to subject the printed material to alcohol resistance test. The rubbed printed material was visually observed to examine the ethanol weight concentration of the evaluation solution at which the printed material rubbed therewith suffered from color migration. The results are shown in Table 4. The larger the value of the ethanol weight concentration becomes, the higher the alcohol resistance of the water-based ink is.

(3) Evaluation of Ejection Stability (Determination of Concentration-Dependent Viscosity Behavior)

The water-based ink prepared above was placed in a petri dish and concentrated by evaporating a solvent therefrom at 40° C. under reduced pressure until the solid content of the ink was reduced to 45% by mass as compared to the solid content of the ink immediately after being prepared. The resulting concentrated ink sample was measured for a viscosity thereof at 32° C. using a rheometer "MCR301" (equipped with a cone plate "CP50-1") available from Anton Paar GmbH. The viscosity values of the respective concentrated water-based inks at a shear rate of 10 (1/s) are shown in Table 4. The smaller the viscosity value of the concentrated water-based ink becomes, the more excellent the concentration-dependent viscosity behavior of the water-based ink is, and the more excellent the ejection stability of the water-based ink is.

(4) Evaluation of Storage Stability

The storage stability of the water-based ink was evaluated by the following method.

The water-based ink prepared above was filled in a closed reaction vessel and subjected to storage test in a thermostatic chamber at 70° C. After the elapse of 1 week from initiation of the storage test, the ink was taken out from the reaction vessel and measured with respect to viscosity thereof (using an E-type viscometer) to observe the change in viscosity of the ink from an initial stage of the storage test. The rate of change in viscosity of the water-based ink was calculated according to the following formula (round down to the nearest decimal) to evaluate storage stability of the water-based ink according to the following evaluation ratings. The rate (%) of change in viscosity of the water-based ink as well as the evaluation results thereof are shown in Table 4.

[Evaluation Ratings]

Rate (%) of Change in Viscosity=[100−[(viscosity after storage)/(viscosity before storage)]×100]

A: Absolute value of the rate of change in viscosity of the ink after being stored at 70° C. for 1 week was less than 5%.

A—: Absolute value of the rate of change in viscosity of the ink after being stored at 70° C. for 1 week was not less than 5% and less than 10%.

B: Absolute value of the rate of change in viscosity of the ink after being stored at 70° C. for 1 week was not less than 10% and less than 20%.

C: Absolute value of the rate of change in viscosity of the ink after being stored at 70° C. for 1 week was not less than 20%, or the ink had no flowability so that the measurement of the viscosity thereof was no longer possible.

TABLE 4

| | | Production of Ink and Evaluation Results | | | | | | |
|---|---|---|---|---|---|---|---|---|
| | | Examples | | | | | | |
| | | 2-1 | 2-2 | 2-3 | 2-4 | 2-5 | 2-6 | 2-7 |
| No. of colored fine particle dispersion | | P-1 | P-2 | P-3 | P-4 | P-5 | P-6 | P-7 |
| Colored fine particle dispersion (p) | No. | ECC-1 | ECC-1 | ECC-1 | ECC-1 | ECC-2 | ECC-3 | ECY-1 |
| | part(s) by mass | 16.64 | 16.64 | 16.64 | 16.64 | 16.87 | 16.64 | 16.64 |
| N-dimethylaminoethanol | part(s) by mass | 0.20 | | | | | | |
| N-methyldiethanolamine | part(s) by mass | | 0.22 | | | 0.29 | 0.22 | 0.22 |
| Diethanolamine | part(s) by mass | | | 0.16 | | | | |
| Triethanolamine | part(s) by mass | | | | 0.22 | | | |
| 1N NaOH aqueous solution | part(s) by mass | | | | | | | |
| Ion-exchanged water | part(s) by mass | 17.41 | 17.39 | 17.45 | 17.39 | 17.09 | 17.39 | 17.39 |
| Propylene glycol | part(s) by mass | 12.50 | 12.50 | 12.50 | 12.50 | 12.50 | 12.50 | 12.50 |
| Diethylene glycol monoisobutyl ether | part(s) by mass | 2.50 | 2.50 | 2.50 | 2.50 | 2.50 | 2.50 | 2.50 |
| "KF-6011"[1] | part(s) by mass | 0.25 | 0.25 | 0.25 | 0.25 | 0.25 | 0.25 | 0.25 |
| "SURFYNOL 440"[2] | part(s) by mass | 0.50 | 0.50 | 0.50 | 0.50 | 0.50 | 0.50 | 0.50 |

TABLE 4-continued

Production of Ink and Evaluation Results

| | | | | | | | | | |
|---|---|---|---|---|---|---|---|---|---|
| Water-based ink | Average particle size | nm | 104.0 | 107.0 | 104.0 | 104.0 | 122.0 | 110.0 | 131.0 |
| | Static surface tension | mN/m | 26.9 | 26.8 | 26.9 | 27.0 | 27.1 | 26.7 | 27.0 |
| | pH | — | 8.91 | 8.69 | 8.41 | 8.01 | 8.72 | 8.88 | 8.77 |
| | Viscosity at 32° C. | mPa·s | 5.71 | 5.08 | 5.34 | 4.94 | 5.89 | 6.01 | 5.45 |
| | Viscosity of concentrated ink | mPa·s | 660 | 600 | 2150 | 850 | 1100 | 990 | 940 |
| | Storage stability | — | A | A | A | A | A | A | A |
| | Rate of change in viscosity | % | 4 | 1 | 2 | 2 | 2 | 2 | 2 |
| Printed materials | Alcohol resistance | — | 60 | 55 | 50 | 30 | 65 | 55 | 60 |

| | | | Examples | | Comparative Examples | | | |
|---|---|---|---|---|---|---|---|---|
| | | | 2-8 | 2-9 | 2-1 | 2-2 | 2-3 | 2-4 |
| No. of colored fine particle dispersion | | | P-8 | P-5 | PC-1 | PC-2 | PC-3 | PC-4 |
| Colored fine particle dispersion (p) | | No. | ECM-1 | ECC-2 | ECC-1 | ECC-2 | ECC-3 | ECC-4 |
| | | part(s) by mass | 16.64 | 16.87 | 16.64 | 16.87 | 16.64 | 23.33 |
| N-dimethylaminoethanol | | part(s) by mass | | | | | | |
| N-methyldiethanolamine | | part(s) by mass | 0.22 | 0.29 | | | | 0.10 |
| Diethanolamine | | part(s) by mass | | | | | | |
| Triethanolamine | | part(s) by mass | | | | | | |
| 1N NaOH aqueous solution | | part(s) by mass | | | 0.59 | 0.49 | 0.59 | |
| Ion-exchanged water | | part(s) by mass | 17.39 | 17.09 | 17.02 | 17.12 | 17.02 | 10.82 |
| Propylene glycol | | part(s) by mass | 12.50 | 15.00 | 12.50 | 12.50 | 12.50 | 12.50 |
| Diethylene glycol monoisobutyl ether | | part(s) by mass | 2.50 | — | 2.50 | 2.50 | 2.50 | 2.50 |
| "KF-6011"*1 | | part(s) by mass | 0.25 | 0.25 | 0.25 | 0.25 | 0.25 | 0.25 |
| "SURFYNOL 440"*2 | | part(s) by mass | 0.50 | 0.50 | 0.50 | 0.50 | 0.50 | 0.50 |
| Water-based ink | Average particle size | nm | 162.0 | 121.5 | 110.0 | 128.0 | 111.0 | 110.0 |
| | Static surface tension | mN/m | 27.1 | 27.8 | 27.0 | 27.4 | 27.2 | 27.5 |
| | pH | — | 8.66 | 8.88 | 8.37 | 8.55 | 8.60 | 8.35 |
| | Viscosity at 32° C. | mPa·s | 5.54 | 5.45 | 6.30 | 5.99 | 6.41 | 4.80 |
| | Viscosity of concentrated ink | mPa·s | 680 | 1050 | 5800 | 4800 | 6750 | 980 |
| | Storage stability | — | A | A | A- | A- | A- | A |
| | Rate of change in viscosity | % | 3 | 3 | 8 | 7 | 9 | 2 |
| Printed materials | Alcohol resistance | — | 60 | 60 | 5 | 10 | 5 | 5 |

Meanwhile, the respective notations with asterisks shown in Table 4 have the following meanings.

*1: Polyether-modified silicone "KF-6011" available from Shin-Etsu Chemical Industry Co., Ltd.

*2: Acetylene-based surfactant "SURFYNOL 440" available from Nissin Chemical Industry Co., Ltd.

It was confirmed that the water-based inks obtained in Examples 2-1 to 2-9 were excellent in storage stability and alcohol resistance, and are further excellent in ejection stability owing to low viscosity of the concentrated ink, as compared to the water-based inks obtained in Comparative Examples 2-1 to 2-4.

The invention claimed is:

1. A colored fine particle dispersion comprising colored fine particles and a neutralizing agent, in which
the colored fine particles are produced by subjecting a monomer mixture comprising an acid group-containing polymerizable monomer to emulsion polymerization in the presence of a pigment;

the pigment is a pigment subjected to no hydrophilic treatment;

the acid group is a carboxy group;

the acid group-containing-polymerizable monomer is at least one monomer selected from the group consisting of (meth)acrylic acid, maleic acid, itaconic acid furmaric acid and crotonic acid;

a content of the acid group-containing polymerizable monomer in the monomer mixture is not less than 1% by mass and not more than 20% by mass;

the neutralizing agent comprises a water-soluble amine compound;

a content of the water-soluble amine compound in the neutralizing agent is not less than 80% by mass;

the acid group is neutralized with the water-soluble amine compound; and the colored fine particle dispersion has a pH value of not less than 6 and not more than 11.

2. The colored fine particle dispersion according to claim 1, wherein the monomer mixture further comprises a hydrophobic polymerizable monomer, and the hydrophobic polymerizable monomer is at least one monomer selected from the group consisting of a (meth)acrylate and an aromatic ring-containing hydrophobic monomer.

3. The colored fine particle dispersion according to claim 1, wherein the water-soluble amine compound is a compound having not less than 2 and not more than 8 carbon atoms.

4. The colored fine particle dispersion according to claim 1, wherein the water-soluble amine compound is an alkanolamine having not less than 2 and not more than 8 carbon atoms.

5. The colored fine particle dispersion according to claim 1, wherein the water-soluble amine compound is at least one compound selected from the group consisting of N-dimethylaminoethanol, N-methyldiethanolamine, diethanolamine and triethanolamine.

6. The colored fine particle dispersion according to claim 1, wherein the colored line particle dispersion is used in a water-based ink for inkjet printing.

7. The colored fine particle dispersion according to claim 1, wherein a solids content of the colored fine particles in the colored fine particle dispersion is not less than 10% by mass and not more than 60% by mass.

8. The colored fine particle dispersion according to claim 2, wherein the (meth)acrylate is at least one compound selected from the group consisting of methyl (meth)acrylate, ethyl (meth)acrylate and 2-ethylhexyl (meth)acrylate.

9. The colored fine particle dispersion according to claim 2, wherein the aromatic ring-containing hydrophobic monomer is at least one monomer selected from the group consisting of a styrene-based monomer and an aromatic group-containing (meth)acrylate.

10. The colored fine particle dispersion according to claim 2, wherein a content of the hydrophobic polymerizable monomer in the monomer mixture is not less than 80% by mass and not more than 99% by mass.

11. The colored fine particle dispersion according to claim 1, wherein the water-soluble amine compound is an alkyl-alkanolamine comprising an alkyl group having not less than 1 and not more than 3 carbon atoms and an alkanol group having not less than 1 and not more than 4 carbon atoms.

12. The colored fine particle dispersion according to claim 1, wherein a polymerizable surfactant is used in the emulsion polymerization, and the polymerizable surfactant is incorporated into the resulting polymer by copolymerizing the monomer mixture therewith.

13. The colored fine particle dispersion according to claim 1, wherein the content of the neutralizing agent in the colored fine particle dispersion is not less than 0.1% by mass and not more than 10% by mass.

14. The colored fine particle dispersion according to claim 6, wherein the content of the neutralizing agent in the water-based ink is not less than 0.1% by mass and not more than 5.0% by mass.

* * * * *